(12) United States Patent
Breslin et al.

(10) Patent No.: US 7,809,595 B2
(45) Date of Patent: Oct. 5, 2010

(54) SYSTEM AND METHOD FOR MANAGING RISKS ASSOCIATED WITH OUTSIDE SERVICE PROVIDERS

(75) Inventors: Jodi Breslin, Great Neck, NY (US); Evelyn Borgia, Hauppauge, NY (US); Graham de Gottal, Readington, NJ (US)

(73) Assignee: JPMorgan Chase Bank, NA, New York, NY (US)

( * ) Notice: Subject to any disclaimer, the term of this patent is extended or adjusted under 35 U.S.C. 154(b) by 1614 days.

(21) Appl. No.: 10/664,283

(22) Filed: Sep. 17, 2003

(65) Prior Publication Data

US 2004/0128186 A1 Jul. 1, 2004

Related U.S. Application Data

(60) Provisional application No. 60/411,284, filed on Sep. 17, 2002.

(51) Int. Cl.
*G06F 17/60* (2006.01)

(52) U.S. Cl. .......................... 705/7; 705/11

(58) Field of Classification Search ............ 705/7, 705/11
See application file for complete search history.

(56) References Cited

U.S. PATENT DOCUMENTS

| | | |
|---|---|---|
| 3,230,650 A | 1/1966 | Orkin |
| 3,634,669 A | 1/1972 | Soumas et al. |
| 3,713,235 A | 1/1973 | Roberts |
| 3,855,033 A | 12/1974 | Staats |
| 3,938,090 A | 2/1976 | Borison et al. |
| 3,946,206 A | 3/1976 | Darjany |
| 4,022,943 A | 5/1977 | Erb et al. |

(Continued)

FOREIGN PATENT DOCUMENTS

CA 2293321 12/1998

(Continued)

OTHER PUBLICATIONS

Aubert et al, "Assessing the Risk of IT Outsourcing", Proceedings of the 31st Hawaii International Conference on System Sciences, 1998.*

(Continued)

*Primary Examiner*—Jonathan G. Sterrett
*Assistant Examiner*—Thomas Mansfield
(74) *Attorney, Agent, or Firm*—Hunton & Williams, LLP

(57) ABSTRACT

A system and method for assessing the risk associated with Outside Service Providers. A decision engine is provided to assess monitor and manage key issues around the risk management capabilities of the OSP. The system creates a core repository that manages, monitors and measures all OSP assessments across an institution (e.g., a corporation). The system and method employs automated questionnaires that require responses from the user (preferably the manager of the OSP relationship). The responses are tracked in order to evaluate the progress of the assessment and the status of the OSP with respect to compliance with the enterprise's requirements for OSPs. Once a questionnaire has been completed, the OSP can be given an overall rating of exposure to various forms of risk. Areas of risk can be acknowledged, prompting a sensitivity rating, such as severe, negligible and so forth. Once risk is acknowledged, a plan for reducing the risk or bringing the OSP into compliance can be formulated, and progress towards compliance can be tracked. Alternatively, an identified exposure to risk can be disclaimed through the system, which requires sign off by various higher level managers and administrators.

28 Claims, 12 Drawing Sheets

U.S. PATENT DOCUMENTS

| | | |
|---|---|---|
| 4,047,033 A | 9/1977 | Malmberg et al. |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| D259,048 S | 4/1981 | Peterson |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,465,206 A | 8/1984 | Sorel et al. |
| 4,479,995 A | 10/1984 | Suzuki et al. |
| 4,545,838 A | 10/1985 | Minkus et al. |
| 4,575,127 A | 3/1986 | Michel |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,643,452 A | 2/1987 | Chang |
| 4,647,714 A | 3/1987 | Goto |
| 4,648,189 A | 3/1987 | Michel |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,755,661 A | 7/1988 | Rucbsam |
| 4,766,293 A | 8/1988 | Boston |
| 4,766,539 A | 8/1988 | Fox |
| 4,777,563 A | 10/1988 | Teraoka et al. |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt et al. |
| 4,831,526 A | 5/1989 | Luchs |
| 4,837,422 A | 6/1989 | Dethloff et al. |
| 4,845,347 A | 7/1989 | McCrindle et al. |
| 4,851,650 A | 7/1989 | Kitade |
| 4,856,857 A | 8/1989 | Takeuchi et al. |
| 4,866,545 A | 9/1989 | Lamanna et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,931,623 A | 6/1990 | Nakamura et al. |
| 4,938,830 A | 7/1990 | Cannistra |
| 4,941,090 A | 7/1990 | McCarthy |
| 4,943,707 A | 7/1990 | Boggan |
| 4,953,085 A | 8/1990 | Atkins |
| D310,386 S | 9/1990 | Michels et al. |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,055,662 A | 10/1991 | Hasegawa |
| 5,072,380 A | 12/1991 | Randelman et al. |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,163,098 A | 11/1992 | Dahbura |
| 5,175,416 A | 12/1992 | Mansvelt |
| 5,177,342 A | 1/1993 | Adams |
| 5,180,901 A | 1/1993 | Hiramatsu |
| 5,185,697 A | 2/1993 | Jacobs et al. |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,257,486 A | 11/1993 | Holmwall |
| 5,276,311 A | 1/1994 | Hartmut |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,326,960 A | 7/1994 | Tannenbaum |
| 5,327,508 A | 7/1994 | Deaton et al. |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,380,046 A | 1/1995 | Stephens |
| 5,382,784 A | 1/1995 | Eberhardt |
| 5,383,113 A | 1/1995 | Kight et al. |
| 5,383,687 A | 1/1995 | Suess et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,413,341 A | 5/1995 | Lieberman |
| 5,424,524 A | 6/1995 | Ruppert et al. |
| 5,432,326 A | 7/1995 | Noblett et al. |
| 5,440,108 A | 8/1995 | Tran et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Henry |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Malark |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |

| | | | | | |
|---|---|---|---|---|---|
| 5,500,890 A | 3/1996 | Rogge et al. | 5,726,884 A | 3/1998 | Sturgeon et al. |
| 5,503,891 A | 4/1996 | Marshall et al. | 5,727,153 A | 3/1998 | Powell |
| 5,511,114 A | 4/1996 | Stimson et al. | 5,728,998 A | 3/1998 | Novis et al. |
| 5,512,654 A | 4/1996 | Holmes et al. | 5,729,693 A | 3/1998 | Holda-Fleck |
| 5,513,102 A | 4/1996 | Auriemma | 5,732,136 A | 3/1998 | Murphree et al. |
| 5,521,363 A | 5/1996 | Tannenbaum | 5,734,154 A | 3/1998 | Jachimowicz et al. |
| 5,530,232 A | 6/1996 | Taylor | 5,734,838 A | 3/1998 | Robinson |
| 5,530,235 A | 6/1996 | Stefik et al. | 5,736,728 A | 4/1998 | Matsubara |
| 5,532,689 A | 7/1996 | Bueno | 5,737,421 A | 4/1998 | Audebert |
| 5,537,314 A | 7/1996 | Kanter | 5,740,549 A | 4/1998 | Reilly et al. |
| 5,541,583 A | 7/1996 | Mandelbaum | 5,742,775 A | 4/1998 | King |
| 5,544,086 A | 8/1996 | Davis et al. | 5,744,787 A | 4/1998 | Teicher |
| 5,544,246 A | 8/1996 | Mandelbaum et al. | 5,745,049 A | 4/1998 | Akiyama et al. |
| 5,546,446 A | 8/1996 | Tsunokawa et al. | 5,745,555 A | 4/1998 | Mark |
| 5,553,120 A | 9/1996 | Katz | 5,745,706 A | 4/1998 | Wolfberg et al. |
| 5,557,092 A | 9/1996 | Ackley et al. | 5,748,737 A | 5/1998 | Daggar |
| 5,557,516 A | 9/1996 | Hogan | 5,749,075 A | 5/1998 | Toader et al. |
| 5,563,934 A | 10/1996 | Eda | 5,760,381 A | 6/1998 | Stich et al. |
| 5,577,109 A | 11/1996 | Stimson et al. | 5,765,138 A | 6/1998 | Aycock et al. |
| 5,578,808 A | 11/1996 | Taylor | 5,765,141 A | 6/1998 | Spector |
| 5,581,064 A | 12/1996 | Riley et al. | 5,770,843 A | 6/1998 | Rose et al. |
| 5,583,933 A | 12/1996 | Mark | 5,770,849 A | 6/1998 | Novis et al. |
| 5,585,787 A | 12/1996 | Wallerstein | 5,774,870 A | 6/1998 | Storey |
| 5,590,038 A | 12/1996 | Pitroda | 5,777,305 A | 7/1998 | Smith et al. |
| 5,592,560 A | 1/1997 | Deaton et al. | 5,777,306 A | 7/1998 | Masuda |
| 5,604,542 A | 2/1997 | Dedrick | 5,777,903 A | 7/1998 | Piosenka et al. |
| 5,608,785 A | 3/1997 | Kasday | 5,778,067 A | 7/1998 | Jones et al. |
| 5,612,868 A | 3/1997 | Off | 5,787,156 A | 7/1998 | Katz |
| 5,617,474 A | 4/1997 | Ditzig et al. | 5,787,404 A | 7/1998 | Fernandez-Holmann |
| 5,619,558 A | 4/1997 | Jheeta | 5,789,733 A | 8/1998 | Jachimowicz et al. |
| 5,621,787 A | 4/1997 | McKoy et al. | 5,790,636 A | 8/1998 | Marshall |
| 5,621,812 A | 4/1997 | Deaton et al. | 5,794,207 A | 8/1998 | Walker |
| 5,637,845 A | 6/1997 | Kolls | 5,796,827 A | 8/1998 | Coppersmith et al. |
| 5,638,457 A | 6/1997 | Deaton et al. | 5,798,950 A | 8/1998 | Fitzgerald |
| 5,642,279 A | 6/1997 | Stone | 5,799,087 A | 8/1998 | Rosen |
| 5,642,485 A | 6/1997 | Deaton et al. | 5,802,176 A | 9/1998 | Audebert |
| 5,644,723 A | 7/1997 | Deaton et al. | 5,805,719 A | 9/1998 | Pare et al. |
| 5,644,727 A | 7/1997 | Atkins | 5,806,042 A | 9/1998 | Kelly et al. |
| 5,649,114 A | 7/1997 | Deaton et al. | 5,806,044 A | 9/1998 | Powell |
| 5,649,117 A | 7/1997 | Landry | 5,806,045 A | 9/1998 | Biorge |
| 5,649,118 A | 7/1997 | Carlisle et al. | 5,807,627 A | 9/1998 | Friend et al. |
| 5,650,604 A | 7/1997 | Marcous et al. | 5,809,478 A | 9/1998 | Greco |
| 5,653,914 A | 8/1997 | Holmes et al. | 5,814,796 A | 9/1998 | Benson et al. |
| 5,659,741 A | 8/1997 | Eberhardt | 5,815,657 A | 9/1998 | Williams et al. |
| 5,664,110 A | 9/1997 | Green et al. | 5,815,658 A | 9/1998 | Kuriyama |
| 5,664,157 A | 9/1997 | Takahira et al. | 5,819,234 A | 10/1998 | Slavin et al. |
| 5,665,953 A | 9/1997 | Mazzamuto | 5,819,237 A | 10/1998 | Garman |
| 5,672,678 A | 9/1997 | Holmes et al. | 5,825,871 A | 10/1998 | Mark |
| 5,675,607 A | 10/1997 | Alesio et al. | 5,826,243 A | 10/1998 | Musmanno et al. |
| 5,675,662 A | 10/1997 | Deaton et al. | 5,832,090 A | 11/1998 | Raspotnik |
| 5,677,521 A | 10/1997 | Garrou | 5,832,457 A | 11/1998 | O'Brien |
| 5,677,955 A | 10/1997 | Doggett et al. | 5,832,488 A | 11/1998 | Eberhardt |
| 5,680,459 A | 10/1997 | Hook et al. | 5,835,061 A | 11/1998 | Stewart |
| 5,684,291 A | 11/1997 | Taskett | 5,835,576 A | 11/1998 | Katz |
| 5,687,322 A | 11/1997 | Deaton et al. | 5,839,113 A | 11/1998 | Federau et al. |
| 5,689,100 A | 11/1997 | Carrithers et al. | 5,845,259 A | 12/1998 | West et al. |
| 5,689,650 A | 11/1997 | McClelland et al. | 5,845,260 A | 12/1998 | Nakano et al. |
| 5,692,132 A | 11/1997 | Hogan | 5,852,811 A | 12/1998 | Atkins |
| 5,696,907 A | 12/1997 | Tom | 5,852,812 A | 12/1998 | Reeder |
| 5,698,837 A | 12/1997 | Furuta | 5,857,079 A | 1/1999 | Claus et al. |
| 5,699,528 A | 12/1997 | Hogan | 5,857,175 A | 1/1999 | Day |
| 5,703,344 A | 12/1997 | Bezy et al. | 5,857,709 A | 1/1999 | Chock |
| 5,704,046 A | 12/1997 | Hogan | 5,859,419 A | 1/1999 | Wynn |
| 5,705,798 A | 1/1998 | Tarbox | 5,864,609 A | 1/1999 | Cross et al. |
| 5,708,422 A | 1/1998 | Blonder et al. | 5,864,828 A | 1/1999 | Atkins |
| 5,710,458 A | 1/1998 | Iwasaki | 5,864,830 A | 1/1999 | Armetta et al. |
| 5,710,886 A | 1/1998 | Christensen et al. | RE36,116 E | 2/1999 | McCarthy |
| 5,710,887 A | 1/1998 | Chelliah | 5,870,718 A | 2/1999 | Spector |
| 5,710,889 A | 1/1998 | Clark et al. | 5,870,721 A | 2/1999 | Norris |
| 5,715,399 A | 2/1998 | Bezos | 5,875,437 A | 2/1999 | Atkins |
| 5,717,925 A | 2/1998 | Harper et al. | 5,877,975 A | 3/1999 | Jigour et al. |
| 5,721,768 A | 2/1998 | Stimson et al. | 5,883,377 A | 3/1999 | Chapin, Jr. |
| 5,721,781 A | 2/1998 | Deo et al. | 5,883,810 A | 3/1999 | Franklin et al. |

| | | | | | | |
|---|---|---|---|---|---|---|
| 5,884,271 A | 3/1999 | Pitroda | | 6,029,144 A | 2/2000 | Barrett et al. |
| 5,884,278 A | 3/1999 | Powell | | 6,029,890 A | 2/2000 | Austin |
| 5,884,285 A | 3/1999 | Atkins | | 6,032,136 A | 2/2000 | Brake, Jr. et al. |
| 5,887,065 A | 3/1999 | Audebert | | 6,032,859 A | 3/2000 | Muehlberger et al. |
| 5,890,138 A | 3/1999 | Godin et al. | | 6,036,099 A | 3/2000 | Leighton |
| 5,890,140 A | 3/1999 | Clark et al. | | 6,038,292 A | 3/2000 | Thomas |
| H1794 H | 4/1999 | Claus | | 6,038,552 A | 3/2000 | Fleischl et al. |
| D408,054 S | 4/1999 | Leedy, Jr. | | 6,041,315 A | 3/2000 | Pollin |
| 5,897,620 A | 4/1999 | Walker et al. | | 6,044,360 A | 3/2000 | Picciallo |
| 5,897,621 A | 4/1999 | Boesch et al. | | 6,045,042 A | 4/2000 | Ohno |
| 5,901,303 A | 5/1999 | Chew | | 6,045,050 A | 4/2000 | Ippolito et al. |
| 5,903,879 A | 5/1999 | Mitchell | | 6,047,067 A | 4/2000 | Rosen |
| 5,905,246 A | 5/1999 | Fajkowski | | 6,047,268 A | 4/2000 | Bartoli et al. |
| 5,907,142 A | 5/1999 | Kelsey | | 6,048,271 A | 4/2000 | Barcelou |
| 5,907,350 A | 5/1999 | Nemirofsky | | 6,049,463 A | 4/2000 | O'Malley et al. |
| 5,911,135 A | 6/1999 | Atkins | | 6,049,773 A | 4/2000 | McCormack et al. |
| 5,911,136 A | 6/1999 | Atkins | | 6,049,782 A | 4/2000 | Gottesman et al. |
| 5,914,472 A | 6/1999 | Foladare et al. | | 6,055,573 A | 4/2000 | Gardenswartz et al. |
| 5,920,629 A | 7/1999 | Rosen | | 6,058,378 A | 5/2000 | Clark et al. |
| 5,920,844 A | 7/1999 | Hotta et al. | | 6,061,660 A | 5/2000 | Eggleston et al. |
| 5,920,847 A | 7/1999 | Kolling et al. | | 6,064,985 A | 5/2000 | Anderson |
| 5,923,734 A | 7/1999 | Taskett | | 6,065,675 A | 5/2000 | Teicher |
| 5,926,792 A | 7/1999 | Koppes et al. | | 6,068,183 A | 5/2000 | Freeman et al. |
| 5,926,800 A | 7/1999 | Baronowski et al. | | 6,070,067 A | 5/2000 | Nguyen et al. |
| 5,928,082 A | 7/1999 | Clapper, Jr. | | 6,070,147 A | 5/2000 | Harms et al. |
| 5,930,217 A | 7/1999 | Kayanuma | | 6,070,153 A | 5/2000 | Simpson |
| 5,931,764 A | 8/1999 | Freeman et al. | | D427,167 S | 6/2000 | Iwasaki |
| 5,933,817 A | 8/1999 | Hucal | | 6,076,068 A | 6/2000 | DeLapa et al. |
| 5,936,221 A | 8/1999 | Corder et al. | | 6,076,072 A | 6/2000 | Libman |
| 5,937,068 A | 8/1999 | Audebert | | 6,078,888 A | 6/2000 | Johnson, Jr. |
| 5,940,811 A | 8/1999 | Norris | | 6,078,891 A | 6/2000 | Riordan et al. |
| 5,946,669 A | 8/1999 | Polk | | 6,085,976 A | 7/2000 | Scher |
| 5,952,641 A | 9/1999 | Korshun | | 6,091,817 A | 7/2000 | Bertina et al. |
| 5,953,423 A | 9/1999 | Rosen | | 6,092,056 A | 7/2000 | Tull, Jr. et al. |
| 5,953,710 A | 9/1999 | Fleming | | 6,092,057 A | 7/2000 | Zimmerman et al. |
| 5,955,961 A | 9/1999 | Wallerstein | | 6,095,412 A | 8/2000 | Bertina et al. |
| 5,956,695 A | 9/1999 | Carrithers et al. | | 6,095,416 A | 8/2000 | Grant et al. |
| 5,963,648 A | 10/1999 | Rosen | | 6,098,053 A | 8/2000 | Slater |
| 5,970,469 A | 10/1999 | Scroggie et al. | | 6,105,006 A | 8/2000 | Davis et al. |
| 5,970,479 A | 10/1999 | Shepherd | | 6,105,008 A | 8/2000 | Davis et al. |
| 5,970,480 A | 10/1999 | Kalina | | 6,105,009 A | 8/2000 | Cuervo |
| 5,974,399 A | 10/1999 | Giuliani et al. | | 6,105,011 A | 8/2000 | Morrison, Jr. |
| RE36,365 E | 11/1999 | Levine et al. | | 6,105,865 A | 8/2000 | Hardesty |
| 5,979,757 A | 11/1999 | Tracy et al. | | 6,109,525 A | 8/2000 | Blomqvist et al. |
| 5,984,180 A | 11/1999 | Albrecht | | 6,112,191 A | 8/2000 | Burke |
| 5,984,191 A | 11/1999 | Chapin, Jr. | | 6,115,458 A | 9/2000 | Taskett |
| 5,987,434 A | 11/1999 | Libman | | 6,119,097 A | 9/2000 | Ibarra |
| 5,988,509 A | 11/1999 | Taskett | | 6,119,103 A | 9/2000 | Basch et al. |
| 5,991,413 A | 11/1999 | Arditti et al. | | 6,119,107 A | 9/2000 | Polk |
| 5,991,743 A | 11/1999 | Irving et al. | | 6,119,932 A | 9/2000 | Maloney et al. |
| 5,991,748 A | 11/1999 | Taskett | | 6,122,623 A | 9/2000 | Garman |
| 5,991,750 A | 11/1999 | Craig | | 6,128,598 A | 10/2000 | Walker et al. |
| 5,999,596 A | 12/1999 | Walker et al. | | 6,128,599 A | 10/2000 | Walker et al. |
| 5,999,624 A | 12/1999 | Hopkins | | 6,129,274 A | 10/2000 | Suzuki |
| 5,999,917 A | 12/1999 | Facciani et al. | | 6,129,572 A | 10/2000 | Feldman et al. |
| 6,000,608 A | 12/1999 | Dorf | | 6,134,309 A | 10/2000 | Carson |
| 6,000,832 A | 12/1999 | Franklin et al. | | 6,134,536 A | 10/2000 | Shepherd |
| 6,002,383 A | 12/1999 | Shimada | | 6,138,911 A | 10/2000 | Fredregill et al. |
| 6,003,762 A | 12/1999 | Hayashida | | 6,138,917 A | 10/2000 | Chapin, Jr. |
| 6,004,681 A | 12/1999 | Epstein et al. | | 6,142,640 A | 11/2000 | Schofield |
| 6,006,988 A | 12/1999 | Behrmann et al. | | 6,144,848 A | 11/2000 | Walsh et al. |
| 6,009,415 A | 12/1999 | Shurling et al. | | 6,145,741 A | 11/2000 | Wisdom et al. |
| 6,014,634 A | 1/2000 | Scroggie et al. | | 6,148,297 A | 11/2000 | Swor et al. |
| 6,014,636 A | 1/2000 | Reeder | | 6,161,096 A | 12/2000 | Bell |
| 6,014,638 A | 1/2000 | Burge et al. | | 6,163,770 A | 12/2000 | Gamble et al. |
| 6,014,645 A | 1/2000 | Cunningham | | 6,163,771 A | 12/2000 | Walker et al. |
| 6,014,749 A | 1/2000 | Gloor et al. | | 6,164,533 A | 12/2000 | Barton |
| 6,016,482 A | 1/2000 | Molinari et al. | | 6,167,385 A | 12/2000 | Hartley-Urquhart |
| 6,016,954 A | 1/2000 | Abe et al. | | 6,169,975 B1 | 1/2001 | White et al. |
| 6,019,284 A | 2/2000 | Freeman et al. | | 6,173,267 B1 | 1/2001 | Cairns |
| 6,021,189 A | 2/2000 | Vu | | 6,179,211 B1 | 1/2001 | Green et al. |
| 6,026,370 A | 2/2000 | Jermyn | | 6,182,048 B1 | 1/2001 | Osborn et al. |
| 6,029,139 A | 2/2000 | Cunningham et al. | | 6,182,059 B1 | 1/2001 | Angotti et al. |

| | | |
|---|---|---|
| D437,882 S | 2/2001 | Creighton |
| 6,182,894 B1 | 2/2001 | Hackett et al. |
| 6,185,541 B1 | 2/2001 | Scroggie et al. |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,192,142 B1 | 2/2001 | Pare, Jr. et al. |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppicich |
| 6,223,143 B1 | 4/2001 | Weinstock et al. |
| D442,627 S | 5/2001 | Webb et al. |
| 6,227,445 B1 | 5/2001 | Brookner |
| 6,227,447 B1 | 5/2001 | Campisano |
| 6,227,972 B1 | 5/2001 | Walker et al. |
| 6,243,688 B1 | 6/2001 | Kalina |
| 6,260,758 B1 | 7/2001 | Blumberg |
| 6,263,316 B1 | 7/2001 | Khan et al. |
| 6,265,977 B1 | 7/2001 | Vega et al. |
| 6,278,981 B1 | 8/2001 | Dembo et al. |
| 6,278,996 B1 | 8/2001 | Richardson et al. |
| 6,282,516 B1 | 8/2001 | Giuliani |
| 6,282,522 B1 | 8/2001 | Davis et al. |
| 6,289,322 B1 | 9/2001 | Kitchen et al. |
| 6,292,786 B1 | 9/2001 | Deaton et al. |
| 6,295,344 B1 | 9/2001 | Marshall |
| 6,295,522 B1 | 9/2001 | Boesch |
| D449,336 S | 10/2001 | Webb et al. |
| 6,298,336 B1 | 10/2001 | Davis et al. |
| 6,308,268 B1 | 10/2001 | Audebert |
| 6,315,193 B1 | 11/2001 | Hogan |
| 6,315,195 B1 | 11/2001 | Ramachandran |
| 6,324,524 B1 | 11/2001 | Lent et al. |
| 6,324,526 B1 | 11/2001 | Dagostino |
| 6,327,575 B1 | 12/2001 | Katz |
| 6,330,543 B1 | 12/2001 | Kepecs |
| 6,330,546 B1 * | 12/2001 | Gopinathan et al. ............ 705/35 |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,344,108 B1 | 2/2002 | Von Medvey et al. |
| 6,345,261 B1 | 2/2002 | Feidelson |
| 6,345,766 B1 | 2/2002 | Taskett et al. |
| 6,349,291 B1 | 2/2002 | Varma |
| 6,349,972 B1 | 2/2002 | Geiger et al. |
| 6,351,735 B1 | 2/2002 | Deaton et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,405,182 B1 | 6/2002 | Cuervo |
| 6,409,593 B1 | 6/2002 | Petrecca |
| 6,411,939 B1 | 6/2002 | Parsons |
| 6,411,947 B1 | 6/2002 | Rice et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,491,782 B1 | 12/2002 | Jaynes |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,821 B1 | 5/2003 | Polk |
| 6,574,603 B1 | 6/2003 | Dickson et al. |
| 6,575,361 B1 | 6/2003 | Graves et al. |
| 6,581,839 B1 | 6/2003 | Lasch et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| 6,594,640 B1 | 7/2003 | Postrel |
| 6,601,040 B1 | 7/2003 | Kolls |
| 6,601,761 B1 | 8/2003 | Katis |
| 6,607,127 B2 | 8/2003 | Wong |
| 6,609,111 B1 | 8/2003 | Bell |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,647,374 B2 * | 11/2003 | Kansal ........................ 705/37 |
| 6,655,587 B2 | 12/2003 | Andrews et al. |
| 6,655,598 B1 | 12/2003 | Curiel |
| 6,659,259 B2 | 12/2003 | Knox et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,687,222 B1 | 2/2004 | Albert et al. |
| 6,693,544 B1 | 2/2004 | Hebbecker |
| 6,705,518 B2 | 3/2004 | Park et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |

| Patent No. | Date | Name |
|---|---|---|
| D493,195 S | 7/2004 | Creighton |
| 6,764,014 B2 | 7/2004 | Lasch et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,802,008 B1 | 10/2004 | Ikefuji et al. |
| 6,805,287 B2 | 10/2004 | Bishop |
| 6,805,289 B2 | 10/2004 | Noriega et al. |
| D498,236 S | 11/2004 | Liu et al. |
| 6,814,282 B2 | 11/2004 | Seifert et al. |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| 6,856,973 B1 * | 2/2005 | Bott .................. 705/36 R |
| 6,865,547 B1 | 3/2005 | Brake, Jr. et al. |
| 6,868,426 B1 | 3/2005 | Mankoff |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 * | 6/2005 | Buddle et al. .................. 705/1 |
| 6,913,193 B1 | 7/2005 | Kawan |
| 6,924,026 B2 | 8/2005 | Jaynes |
| 6,931,382 B2 | 8/2005 | Laage et al. |
| 6,942,156 B2 | 9/2005 | Ohta et al. |
| 6,942,569 B2 | 9/2005 | Petracca |
| 6,945,453 B1 | 9/2005 | Schwarz Jr. |
| 6,947,898 B2 | 9/2005 | Postrel |
| 6,954,741 B1 | 10/2005 | Burchetta et al. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,999,569 B2 | 2/2006 | Risafi et al. |
| 6,999,938 B1 | 2/2006 | Libman |
| 6,999,943 B1 | 2/2006 | Johnson et al. |
| 7,006,992 B1 | 2/2006 | Packwood |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,082,416 B2 | 7/2006 | Anderson |
| 7,083,084 B2 | 8/2006 | Graves et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley et al. |
| 7,104,443 B1 | 9/2006 | Paul et al. |
| 7,107,249 B2 | 9/2006 | Dively et al. |
| 7,113,914 B1 | 9/2006 | Spielmann et al. |
| D530,741 S | 10/2006 | Blossom |
| 7,120,601 B2 | 10/2006 | Chen et al. |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |
| 7,228,155 B2 | 6/2007 | Saunders |
| 7,234,065 B2 | 6/2007 | Breslin et al. |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,112 B2 | 7/2007 | Berardi et al. |
| 7,252,223 B2 | 8/2007 | Schofield |
| 7,252,226 B2 | 8/2007 | Risafi et al. |
| 7,254,560 B2 | 8/2007 | Singhal |
| D551,705 S | 9/2007 | Mershon |
| 7,266,524 B1 | 9/2007 | Butcher, III |
| 7,275,160 B2 | 9/2007 | Pearson et al. |
| 7,295,999 B1 | 11/2007 | Simon et al. |
| 7,306,141 B2 | 12/2007 | Schwarz, Jr. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| D562,888 S | 2/2008 | Brown |
| 7,346,567 B2 | 3/2008 | Weeks |
| 7,349,866 B2 | 3/2008 | Schwarz, Jr. |
| 7,357,331 B2 | 4/2008 | Blossom |
| 7,359,880 B2 | 4/2008 | Abel et al. |
| 7,392,221 B2 | 6/2008 | Nabe |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| D576,671 S | 9/2008 | Field et al. |
| 7,433,829 B2 | 10/2008 | Borgia et al. |
| D582,476 S | 12/2008 | Field et al. |
| D582,977 S | 12/2008 | Field et al. |
| 7,461,028 B2 | 12/2008 | Wronski, Jr. |
| 7,493,288 B2 | 2/2009 | Biship et al. |
| 7,502,758 B2 | 3/2009 | Burke |
| 7,503,503 B2 | 3/2009 | Riedl et al. |
| 7,505,918 B1 | 3/2009 | Spielmann et al. |
| 7,506,806 B2 | 3/2009 | Bonalle et al. |
| 7,536,433 B2 | 5/2009 | Reilly |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 7,660,763 B1 | 2/2010 | Brake, Jr. et al. |
| 7,676,425 B1 | 3/2010 | Noles |
| 7,707,111 B2 | 4/2010 | Brake, Jr. et al. |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034663 A1 | 10/2001 | Teveler et al. |
| 2001/0034682 A1 | 10/2001 | Knight et al. |
| 2001/0034684 A1 | 10/2001 | Cushing et al. |
| 2001/0037276 A1 | 11/2001 | Kelly et al. |
| 2001/0037315 A1 | 11/2001 | Saliba et al. |
| 2001/0044293 A1 | 11/2001 | Morgan |
| 2001/0044733 A1 | 11/2001 | Lee et al. |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |

| | | | | | |
|---|---|---|---|---|---|
| 2001/0056398 A1 | 12/2001 | Scheirer | 2003/0040959 A1 | 2/2003 | Fei et al. |
| 2002/0010591 A1 | 1/2002 | Pomerance | 2003/0046249 A1 | 3/2003 | Wu |
| 2002/0013751 A1 | 1/2002 | Facciani et al. | 2003/0046542 A1 | 3/2003 | Chen et al. |
| 2002/0019793 A1 | 2/2002 | Frattalone | 2003/0053609 A1 | 3/2003 | Risafi et al. |
| 2002/0019803 A1 | 2/2002 | Muller | 2003/0055780 A1 | 3/2003 | Hansen et al. |
| 2002/0026416 A1 | 2/2002 | Provinse | 2003/0055782 A1 | 3/2003 | Slater |
| 2002/0026418 A1 | 2/2002 | Koppel et al. | 2003/0061168 A1 | 3/2003 | Routhenstein |
| 2002/0032609 A1 | 3/2002 | Wilkman | 2003/0065624 A1 | 4/2003 | James et al. |
| 2002/0035527 A1 | 3/2002 | Corrin | 2003/0074167 A1 | 4/2003 | Browne et al. |
| 2002/0046089 A1 | 4/2002 | Zorn | 2003/0074290 A1 | 4/2003 | Clore |
| 2002/0046255 A1 | 4/2002 | Moore et al. | 2003/0078815 A1 | 4/2003 | Parsons |
| 2002/0062235 A1 | 5/2002 | Wahlbin et al. | 2003/0085272 A1 | 5/2003 | Andrews et al. |
| 2002/0062249 A1 | 5/2002 | Iannacci | 2003/0085286 A1 | 5/2003 | Kelley et al. |
| 2002/0062279 A1 | 5/2002 | Behrenbrinker et al. | 2003/0101119 A1 | 5/2003 | Persons et al. |
| 2002/0065712 A1 | 5/2002 | Kawan et al. | 2003/0105672 A1 | 6/2003 | Epstein et al. |
| 2002/0065720 A1 | 5/2002 | Carswell et al. | 2003/0105714 A1 | 6/2003 | Alarcon-Luther et al. |
| 2002/0069122 A1 | 6/2002 | Yun et al. | 2003/0110111 A1 | 6/2003 | Nalebuff et al. |
| 2002/0073030 A1 | 6/2002 | Offer | 2003/0120571 A1 | 6/2003 | Blagg |
| 2002/0077964 A1 | 6/2002 | Brody et al. | 2003/0130940 A1 | 7/2003 | Hansen et al. |
| 2002/0077978 A1 | 6/2002 | O'Leary et al. | 2003/0130948 A1 | 7/2003 | Algiene et al. |
| 2002/0082990 A1 | 6/2002 | Jones | 2003/0135453 A1 | 7/2003 | Caulfield et al. |
| 2002/0087373 A1* | 7/2002 | Dickstein et al. ............... 705/7 | 2003/0135459 A1 | 7/2003 | Abelman et al. |
| 2002/0091572 A1 | 7/2002 | Anderson et al. | 2003/0135462 A1 | 7/2003 | Brake, Jr. et al. |
| 2002/0091631 A1 | 7/2002 | Usui | 2003/0140004 A1 | 7/2003 | O'Leary et al. |
| 2002/0091632 A1 | 7/2002 | Turock et al. | 2003/0144935 A1 | 7/2003 | Sobek |
| 2002/0091649 A1 | 7/2002 | Anvekar et al. | 2003/0149660 A1 | 8/2003 | Canfield |
| 2002/0095365 A1 | 7/2002 | Slavin et al. | 2003/0154125 A1 | 8/2003 | Mittal et al. |
| 2002/0099586 A1* | 7/2002 | Bladen et al. ................. 705/7 | 2003/0154163 A1 | 8/2003 | Phillips et al. |
| 2002/0099667 A1 | 7/2002 | Diamandis et al. | 2003/0163403 A1 | 8/2003 | Chen et al. |
| 2002/0104878 A1 | 8/2002 | Seifert et al. | 2003/0163416 A1 | 8/2003 | Kitajima |
| 2002/0111886 A1 | 8/2002 | Chenevich et al. | 2003/0167218 A1 | 9/2003 | Field et al. |
| 2002/0111916 A1 | 8/2002 | Coronna et al. | 2003/0167220 A1 | 9/2003 | Schoen et al. |
| 2002/0116271 A1 | 8/2002 | Mankoff | 2003/0172040 A1 | 9/2003 | Kemper et al. |
| 2002/0116330 A1 | 8/2002 | Hed et al. | 2003/0182218 A1 | 9/2003 | Blagg |
| 2002/0117541 A1 | 8/2002 | Biggar et al. | 2003/0182246 A1 | 9/2003 | Johnson et al. |
| 2002/0120627 A1 | 8/2002 | Mankoff | 2003/0187787 A1 | 10/2003 | Freund |
| 2002/0120642 A1 | 8/2002 | Fetherston | 2003/0195808 A1 | 10/2003 | Brown et al. |
| 2002/0129221 A1* | 9/2002 | Borgia et al. ................. 712/1 | 2003/0195842 A1 | 10/2003 | Reece |
| 2002/0133461 A1 | 9/2002 | Ramachandran | 2003/0200143 A9 | 10/2003 | Walker et al. |
| 2002/0138418 A1 | 9/2002 | Zarin et al. | 2003/0200179 A1 | 10/2003 | Kwan |
| 2002/0139843 A1 | 10/2002 | Park et al. | 2003/0200180 A1 | 10/2003 | Phelan et al. |
| 2002/0143703 A1 | 10/2002 | Razvan et al. | 2003/0204421 A1 | 10/2003 | Houle et al. |
| 2002/0145039 A1 | 10/2002 | Carroll | 2003/0205616 A1 | 11/2003 | Graves |
| 2002/0147662 A1 | 10/2002 | Anderson | 2003/0213843 A1 | 11/2003 | Jackson |
| 2002/0147683 A1 | 10/2002 | Capobianco et al. | 2003/0216965 A1 | 11/2003 | Libman |
| 2002/0152168 A1 | 10/2002 | Neofytides et al. | 2003/0217005 A1 | 11/2003 | Drummond et al. |
| 2002/0156723 A1 | 10/2002 | Lilly et al. | 2003/0217329 A1 | 11/2003 | Good |
| 2002/0161699 A1 | 10/2002 | Okamoto et al. | 2003/0218062 A1 | 11/2003 | Noriega et al. |
| 2002/0161702 A1 | 10/2002 | Milberger et al. | 2003/0218066 A1 | 11/2003 | Fernandes et al. |
| 2002/0165771 A1 | 11/2002 | Walker et al. | 2003/0222136 A1 | 12/2003 | Bolle et al. |
| 2002/0165820 A1 | 11/2002 | Anvekar et al. | 2003/0229525 A1* | 12/2003 | Callahan et al. ............... 705/7 |
| 2002/0169719 A1 | 11/2002 | Dively et al. | 2003/0236704 A1 | 12/2003 | Antonucci |
| 2002/0174016 A1 | 11/2002 | Cuervo | 2004/0024672 A1 | 2/2004 | Brake, Jr. et al. |
| 2002/0174018 A1 | 11/2002 | Bunger et al. | 2004/0024693 A1 | 2/2004 | Lawrence |
| 2002/0174030 A1 | 11/2002 | Praisner et al. | 2004/0029569 A1 | 2/2004 | Khan et al. |
| 2002/0178025 A1 | 11/2002 | Hansen et al. | 2004/0030626 A1 | 2/2004 | Libman |
| 2002/0178063 A1 | 11/2002 | Gravelle et al. | 2004/0039588 A1 | 2/2004 | Libman |
| 2002/0190123 A1 | 12/2002 | Anvekar et al. | 2004/0049452 A1 | 3/2004 | Blagg |
| 2002/0194081 A1 | 12/2002 | Perkowski | 2004/0059952 A1 | 3/2004 | Newport et al. |
| 2002/0194098 A1 | 12/2002 | Stiff et al. | 2004/0064332 A1 | 4/2004 | Zou et al. |
| 2002/0194124 A1 | 12/2002 | Hobbs et al. | 2004/0064402 A1 | 4/2004 | Dreyer et al. |
| 2002/0198848 A1 | 12/2002 | Michener | 2004/0064436 A1 | 4/2004 | Breslin et al. |
| 2003/0004828 A1 | 1/2003 | Epstein | 2004/0088236 A1 | 5/2004 | Manning |
| 2003/0010831 A1 | 1/2003 | Ye | 2004/0088238 A1 | 5/2004 | Gilson et al. |
| 2003/0018549 A1 | 1/2003 | Fei et al. | 2004/0093296 A1 | 5/2004 | Phelan et al. |
| 2003/0018613 A1 | 1/2003 | Oytac | 2004/0093303 A1 | 5/2004 | Picciallo |
| 2003/0023549 A1 | 1/2003 | Armes et al. | 2004/0094624 A1 | 5/2004 | Fernandes et al. |
| 2003/0028483 A1 | 2/2003 | Sanders et al. | 2004/0098351 A1 | 5/2004 | Duke |
| 2003/0028518 A1 | 2/2003 | Mankoff | 2004/0103431 A1 | 5/2004 | Davenport et al. |
| 2003/0031321 A1 | 2/2003 | Mages | 2004/0117202 A1 | 6/2004 | Winklevoss et al. |
| 2003/0033211 A1 | 2/2003 | Haines et al. | 2004/0118914 A1 | 6/2004 | Smith et al. |
| 2003/0033246 A1 | 2/2003 | Slater | 2004/0122736 A1 | 6/2004 | Strock et al. |
| 2003/0040927 A1 | 2/2003 | Sato et al. | 2004/0128186 A1 | 7/2004 | Breslin et al. |

| | | | | | | |
|---|---|---|---|---|---|---|
| 2004/0128195 A1 | 7/2004 | Sorem | | 2007/0020443 A1 | 1/2007 | Lo |
| 2004/0128217 A1 | 7/2004 | Friedman et al. | | 2007/0034700 A1 | 2/2007 | Poidomani et al. |
| 2004/0133787 A1 | 7/2004 | Doughty et al. | | 2007/0063025 A1 | 3/2007 | Blossom |
| 2004/0149544 A1 | 8/2004 | Dal Ferro | | 2007/0078719 A1 | 4/2007 | Schmitt et al. |
| 2004/0155101 A1 | 8/2004 | Royer et al. | | 2007/0136211 A1 | 6/2007 | Brown et al. |
| 2004/0158517 A1 | 8/2004 | Mahaney et al. | | 2007/0156530 A1 | 7/2007 | Schmitt et al. |
| 2004/0159700 A1 | 8/2004 | Khan et al. | | 2007/0203825 A1 | 8/2007 | Hanifin et al. |
| 2004/0172350 A1 | 9/2004 | Atkinson et al. | | 2007/0208671 A1 | 9/2007 | Brown et al. |
| 2004/0193539 A1 | 9/2004 | Sullivan | | 2007/0215688 A1 | 9/2007 | Routhenstein |
| 2004/0210498 A1 | 10/2004 | Freund | | 2007/0265924 A1 | 11/2007 | Schwarz |
| 2004/0215507 A1 | 10/2004 | Levitt et al. | | 2007/0283171 A1 | 12/2007 | Breslin et al. |
| 2004/0232223 A1 | 11/2004 | Beenau et al. | | 2008/0005018 A1 | 1/2008 | Powell |
| 2004/0236688 A1 | 11/2004 | Bozeman | | 2008/0010202 A1 | 1/2008 | Schwarz |
| 2004/0239481 A1 | 12/2004 | Beenau et al. | | 2008/0027841 A1 | 1/2008 | Eder |
| 2004/0242308 A1 | 12/2004 | Gray | | 2008/0177659 A1 | 7/2008 | Lacey et al. |
| 2004/0243498 A1 | 12/2004 | Duke | | 2008/0187770 A1 | 8/2008 | Funicelli et al. |
| 2004/0252012 A1 | 12/2004 | Beenau et al. | | 2008/0230600 A1 | 9/2008 | Black et al. |
| 2005/0021353 A1 | 1/2005 | Aviles et al. | | 2008/0245865 A1 | 10/2008 | Mosteller |
| 2005/0021400 A1 | 1/2005 | Postrel | | 2008/0301041 A1 | 12/2008 | Bruk |
| 2005/0021457 A1 | 1/2005 | Johnson et al. | | 2009/0043651 A1 | 2/2009 | Schwarz |
| 2005/0027649 A1 | 2/2005 | Cech | | 2009/0048972 A1 | 2/2009 | Bierer et al. |
| 2005/0033619 A1 | 2/2005 | Barnes et al. | | 2009/0150370 A1 | 6/2009 | Christensen et al. |
| 2005/0035192 A1 | 2/2005 | Bonalle et al. | | 2009/0230195 A1 | 9/2009 | Lasch et al. |
| 2005/0035847 A1 | 2/2005 | Bonalle et al. | | 2009/0240620 A1 | 9/2009 | Kendrick et al. |
| 2005/0040242 A1 | 2/2005 | Beenau et al. | | 2009/0242645 A1 | 10/2009 | Komatsu et al. |
| 2005/0049950 A1 | 3/2005 | Johnson | | 2009/0250522 A1 | 10/2009 | Williams et al. |
| 2005/0060260 A1 | 3/2005 | Masuda et al. | | 2009/0261161 A1 | 10/2009 | Blossom |
| 2005/0065877 A1 | 3/2005 | Cleary et al. | | 2009/0265275 A1 | 10/2009 | Everhart |
| 2005/0071230 A1 | 3/2005 | Mankoff | | 2009/0271853 A1 | 10/2009 | Everhart |
| 2005/0075932 A1 | 4/2005 | Mankoff | | 2010/0030675 A1 | 2/2010 | Hanan et al. |
| 2005/0077349 A1 | 4/2005 | Bonalle et al. | | 2010/0030697 A1 | 2/2010 | Goodrich et al. |
| 2005/0077350 A1 | 4/2005 | Courtion et al. | | | | |
| 2005/0091138 A1 | 4/2005 | Awatsu | | | FOREIGN PATENT DOCUMENTS | |
| 2005/0091492 A1 | 4/2005 | Benson et al. | | | | |
| 2005/0102228 A1 | 5/2005 | Srinivasan et al. | | DE | 19702532 | 3/1998 |
| 2005/0108152 A1 | 5/2005 | Tsoa Lee et al. | | DE | 102006015818 | 10/2007 |
| 2005/0114883 A1 | 5/2005 | Nagai et al. | | EP | 0843292 A2 | 5/1998 |
| 2005/0116024 A1 | 6/2005 | Beenau et al. | | EP | 0855659 | 7/1998 |
| 2005/0119979 A1 | 6/2005 | Murashita et al. | | EP | 959440 | 11/1999 |
| 2005/0167488 A1 | 8/2005 | Higgins et al. | | GB | 2275654 A | 9/1994 |
| 2005/0171842 A1 | 8/2005 | Tien et al. | | GB | 2376787 | 12/2002 |
| 2005/0171898 A1 | 8/2005 | Bishop et al. | | GB | 2377071 | 12/2002 |
| 2005/0179251 A1 | 8/2005 | Wagoner et al. | | GB | 2377314 | 1/2003 |
| 2005/0189427 A1 | 9/2005 | Brown et al. | | JP | 53-118104 | 10/1978 |
| 2005/0199705 A1 | 9/2005 | Beck et al. | | JP | 64-87397 | 3/1989 |
| 2005/0206499 A1 | 9/2005 | Fisher | | JP | 3-114879 | 5/1991 |
| 2005/0216888 A1 | 9/2005 | Drummond et al. | | JP | 4-073193 | 3/1992 |
| 2005/0234771 A1 | 10/2005 | Register et al. | | JP | 4-201392 | 7/1992 |
| 2005/0269396 A1 | 12/2005 | Schofield | | JP | 5-011676 | 1/1993 |
| 2005/0289044 A1 | 12/2005 | Breslin et al. | | JP | 8-080680 | 3/1996 |
| 2006/0020542 A1 | 1/2006 | Litle | | JP | 8-096098 | 4/1996 |
| 2006/0026092 A1 | 2/2006 | Klein et al. | | JP | 10-116016 | 5/1998 |
| 2006/0036543 A1 | 2/2006 | Blagg et al. | | JP | 2000-113151 | 4/2000 |
| 2006/0036553 A1 | 2/2006 | Gupta et al. | | JP | 2002-259933 | 9/2002 |
| 2006/0039733 A1 | 2/2006 | Meyerhofer | | JP | 2002-366015 | 12/2002 |
| 2006/0041540 A1 | 2/2006 | Shannon et al. | | JP | 2005-246658 | 9/2005 |
| 2006/0047573 A1 | 3/2006 | Mitchell et al. | | JP | 2008-015071 | 1/2008 |
| 2006/0047589 A1 | 3/2006 | Grau | | WO | WO 94/29112 | 12/1994 |
| 2006/0074794 A1 | 4/2006 | Nespola, Jr. | | WO | WO 97-20692 | 6/1997 |
| 2006/0085334 A1 | 4/2006 | Murphy | | WO | WO 97/41673 | 11/1997 |
| 2006/0106696 A1 | 5/2006 | Carlson | | WO | WO 9810368 | 3/1998 |
| 2006/0116903 A1 | 6/2006 | Becerra | | WO | WO 98/59307 | 12/1998 |
| 2006/0116995 A1 | 6/2006 | Strayer et al. | | WO | WO 99/05633 | 2/1999 |
| 2006/0122918 A1 | 6/2006 | Graboske et al. | | WO | WO 9954841 | 10/1999 |
| 2006/0131869 A1 | 6/2006 | Brignull | | WO | WO 01/18699 | 3/2001 |
| 2006/0157557 A1 | 7/2006 | Lee et al. | | WO | WO 01/69347 | 9/2001 |
| 2006/0224480 A1 | 10/2006 | Bent et al. | | WO | WO 01/69347 A2 | 9/2001 |
| 2006/0242057 A1 | 10/2006 | Velarde | | WO | WO 01/69347 A3 | 9/2001 |
| 2006/0249574 A1 | 11/2006 | Brown et al. | | WO | WO 0188659 | 11/2001 |
| 2006/0251478 A1 | 11/2006 | Desmeules | | WO | WO 2005/043277 A3 | 5/2005 |
| 2006/0259364 A1 | 11/2006 | Strock et al. | | WO | WO 2005101975 | 11/2005 |
| 2006/0261927 A1 | 11/2006 | Kelly et al. | | WO | WO 2006060370 | 6/2006 |
| 2006/0289636 A1 | 12/2006 | Hoblit | | WO | WO 2006105092 | 10/2006 |

| | | |
|---|---|---|
| WO | WO 2006116772 | 11/2006 |
| WO | WO 2007-115725 | 10/2007 |
| WO | WO 2008021381 | 2/2008 |
| WO | WO 2008021382 | 2/2008 |
| WO | WO 2009023817 | 2/2009 |

OTHER PUBLICATIONS

Alleman, "Risk Assessment Template for Software Development or Acquisition Projects", Niwot Ridge Consulting, Revision D, Feb. 20, 2001.*

5500—FDIC General Counsel's Opinion No. 8—Stored Value Cards, 61 Fed. Reg. 40490, http://www.fdic.gov/regulations/laws/rules/5500-500.html, Aug. 2, 1996.

Song, A Card That Asks for ID, Time Magazine, Apr. 12, 2004, 1 page.

A Store Card Issuer Looks for Lift from Electronic Gift Certificates, Credit Card News, Feb. 1, 1995, 2 pages.

Claessens, et al., A Tangled World Wide Web of Security Issues, First Monday, retrieved from the internet at http://www.firstmonday.org/issues/issue7_3/claessens, retrieved from the internet on Oct. 6, 2006.

Hotchkiss, ATM's at the head of their class, Bank Marketing, vol. 29, No. 3, Mar. 1997, pp. 26-32.

Edwards, ATMs The Hot New Media Buy, ABA Banking Journal, Mar. 1999, pp. 58, 60.

American Express Incentive Services, Incentive, Sep. 1996, p. 126.

Fickenscher, Amex Prepaid Offering is Latest Card for Firms Regarding Employees, American Banker, vol. 161, No. 151, Aug. 8, 1996, pp. 1-2.

Neumann, An Enhanced Neural Network Technique for Software Risk Analysis, IEEE Transactions on Software Engineering, vol. 28, No. 9, Sep. 1, 2002, pp. 904-912.

Associates First Capital Corporation, Hoover's Inc., The Industry Standard: The Newsmagazine of the Internet Economy, thestandard.net/companies/company-display, Apr. 6, 1999.

Award Card Comparison, JA7922.

Brehl, Banks issue cash-card pledge, The Toronto Star, Oct. 9, 1997, 1 page.

Blockbuster running test of a stored value card, The American Banker, Sep. 1, 1995.

Meece, Boatman's Prepaid Cards for Worker-Incentive Firm, American Banker, Jul. 2, 1996, p. 12.

Boatmen's Floats Stored Value into the Employee Incentive Waters, Debit Card News, vol. 2, Issue 2, Jul. 16, 1996, 3 pages.

CES/NaBANCO introduces stored value card technology blockbuster video is first merchant partner, Business Wire, Inc., Jan. 15, 1996.

Card Based Award Systems, JA8309.

CardEx Incentives, www.cardex.com, Apr. 6, 1999.

CardFlash, Apr. 5, 2005.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Rosen, Cash Just Isn't Flexible Enough: Shops of the Future Will Only Take Cards, Daily Express, Technology Section, Feb. 10, 1995, 1 page.

Bank, Cash, Check,Charge—What's Next?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Nora Wood, Corporate Spotlight, Incentive, Dec. 1997, 4 pages.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

D.C. Area Safeway Stores Look for Increase in Sales Volume and Revenue with Cards, Card News, vol. 6, No. 25, Dec. 30, 1991, pp. 7-9.

Piskora, Debit Cards Seen Poised for New Markets, American Banker, Credit/Debit/ATMs, Mar. 7, 1995, p. 16.

Definition of Store-Value Card, Wikipedia, retrieved from the internet at http://en.wikipedia.org/wiki/Stored-value_card, retrieved from the internet on Apr. 16, 2007.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

Eight Keys to Making the Right Choice, Incentive, Dec. 1996, 9 pages.

D. O'Mahony, Electronic Payment System, 1997, Artech House, XP002137255, p. 7-11.

Business Times, Electronic Purse Can Free You from ATM Drag, Business Times, www.btimes.co.za, printed Feb. 23, 2001, 1 page.

Electronic Purse, SCIA (Smart Card Industry Association), About Smart Cards, www.scia.org, printed Feb. 23, 2001, 1 page.

Sanchez-Klein, Electronic purse alliance planned, Computerworld Online News, Jul. 29, 1998, printed Feb. 23, 2001, 2 pages.

Electronic purse card to be launched tomorrow, New Straits Times, News Clippings, Sep. 18, 1999, printed Feb. 23, 2001, 3 pages.

Exclusively Yours From Maritz . . . The MasterCard Card Ultimate Incentive, Incentive, Oct. 1995, 3 pages.

Block, First Data Subsidiary Creates Payroll Card for the Bankless, LexisNexis Academic, Credit/Debit/ATMs, p. 10, Mar. 21, 1997.

First Data markets stored-value cards, Cards International, Jan. 30, 1996, p. 5.

First USA—Activate Today and Get One Hour Free Calling Card Calls, Call 1-800-555-2535, First USA, 6 pages.

First USA—Call 1(800)335-2453 To Receive One Free Hour of Domestic Long Distance Calling (No Strings Attached), First USA, 6 pages.

First USA Platinum Connect, First USA Bank, First USA Promotional Mailing, Oct. 1997, 6 pages.

First Union Issues Smart Cards to Fort Benning Recruits, CardFax, vol. 1999, No. 60, Mar. 26, 1999, 1 page.

Norris, First data unit develops blockbuster cash card, Omaha World Hearld Sunrise Edition, Business Section, Jan. 19, 1996, p. 16.

Frequently asked questions, ECARD, www.eregard.com, printed Sep. 23, 2001, 7 pages.

Glossman, et al.,, Glossman, et al., Citicorp Company Report, Report No. 1647151, p. 8 of 16.

Machlis, Have it the smart way: Burger King program drives smart-card use, Computerworld, printed Feb. 23, 2001, 1 page.

Here's the calling convenience you asked for: 1-800-call-ATT . . . For All Calls, AT&T, Appendix A: For Card Carriers, 1999, 7 pages.

Hoovers, General Mills, Inc. Corporate Profile relied upon to show the history of the company, http://cobrands.hoovers.com/global/cobrands/proquest/history.xhtml?COID=10639, Jul. 12, 2005, 2 pages.

How Is It Different?, JA8331.

Konrad, IBM Had a Bunch of Unusual Ideas in 2003, www.philly.com, printed Jan. 21, 2004, posted on Jan. 13, 2004, 2 pages.

Incenticard, Bellsouth, JA8329.

Judy Quinn, Incentive Cards Explained, Incentive, Dec. 1995, 5 pages.

Incentive Firms Find Debit Cards A Rewarding Experience (Off-line debit card issuers converge efforts with companies looking for effective incentives to boost employee productivity and to motivate individuals to buy their products), Debit Card News, Vol.

Vincent Alonzo, Incentive Marketing . . . Three If by Smart Card, Incentive Sep. 1995, p. 11.

Incentive gift Card: Another way to give the gift of choice!, Incentive, Aug. 1995, 2 pages.

Coulton, Incentives Field Moving to Card-Based Series 14, American Banker, Mar. 26, 1998, 3 pages.

Introducing SpendingMoney(TM), Armetta: Marketing & Design Product Concept Report, Oct. 9, 1996, 15 pages.

Introducing the First USA Platinum Connect Card, First USA Promotional Mailing, Dec. 1997, 2 pages.

Key Bank Holiday Offer, http://www.key.com/swiftgift/home.html, printed Apr. 5, 1999.

LexisNexis Academic, Debit Card Innovation, vol. XXXV, No. 5, p. 2, May 1997.

LexisNexis Academic, Debit Cards: Payroll Card Ups Fees, Future Banker, p. 18, Oct. 6, 1997.

LexisNexis Academic, NTS' TransPay Debit Card Helps Remote and Unbanked Employees Get Funds Quicker, Financial News, Mar. 18, 1997.

MailFrontier Survey Finds that Consumers Hold Financial Institutions Accountable for Online Identitiy Theft, www.mailfrontier.com, Palo Alto, CA, Nov. 2004.

O'Conner, Maritz Gets MasterCard's Stamp of Approval, Business Travel News, Aug. 19, 1996, 2 pages.

Maritz, Incentive, Jun. 1996, p. 111.

Meridian Award Cards, JA8251.

Meridian—the leader in card marketing, JA8343.

Meridicard vs. Debit Cards, JA7917.

Clark, Microsoft, Visa to Jointly Develop PC Electronic-Shopping Software, The Wall Street Journal, Nov. 9, 1994, WSJ B9.

More Retailers Turn to Co-Branding, Chain Store Age Executive with Shopping Center Age, Feb. 1, 1995, 3 pages.

Bogle, Mutual Funds at the Millennium: Fund Directors and Fund Myths, The Vanguard Group to the '40 Act Institute of PLI (Practicing Law Institute), New York, NY, May 15, 2000, 15 pages.

New 1-800-CALL-ATT Campaign Promotes One Number for All Calls, AT&T Marketing, News Release, www.att.com/press/0297/970217.csa.htm, Feb. 17, 1997, 2 pages.

Schwab, Charles, Now 7 Ways for a better Total Return for Your Money; Schwat 1, The Inventor's Asset Management Account, Charles R. Schwab, Charles Schwab & Co., Inc., 16 pages.

Allen et al., Overview of Smart Cards and the Industry, Smart Cards: Seizing Strategic Business Opportunities, Chapter 1, p. 2-20, Irwin Professional Publishing, 1997.

Paper or Plastic? With these three incentives, The Choice is Yours, Incentive, Feb. 1996, 2 pages.

Dugas, Payroll May Ask: Paper or Plastic?, USA Today, 3B, Aug. 14, 2001, 1 page.

Proton world and Europay to co-operate in creation of new CEPS-compliant e-purse application, Press Release 1999, Waterloo, Belgium, Jun. 28, 1999, 2 pages.

Brown et al., Purchasing Card Magic: Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

SK100 Smart Card Electronic Purse Balance Reader, SK100 Balance Reader, http://perso.wanadoo.fr, printed Feb. 23, 2001, 1 page.

Miller, Section E.2.1: Kerberos Authentication and Authorization System, Project Athena, Cambridge, MA, Dec. 21, 1987, 39 pages.

Souccar, Smart Cards: 1st Union Smart Card Pilot Enlists a Second Army Base, American Banker, Digital Frontiers, vol. 164, No. 61, Mar. 31, 1999, 3 pages.

Smart Cards: Big Brother's Little Helpers, The Privacy Committee of New South Wales, No. 66, Aug. 1995.

Smart card for loyalty and e-purse applications eclipses capability of conventional mag-stripe cards, Press Release, www.1.sib.com, Apr. 21, 1997, printed Feb. 23, 2001, 3 pages.

SmartAxis: Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards: Costly Private Substitutions for Government Currency, Economic Quarterly, 1996, Economic Quarterly, v82, n3, p1(25), ISSN: 1069-7225, 17 pages.

Lazarony, Stuck for a gift? Give a prepaid credit card, www.bankrate.com, Dec. 21, 1998, 1 page.

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN: 1093-1279, p 25+, Feb. 1998, pp. 1-8.

The Electronic Purse Reaches the Car Park, http:\\docs.vircom.net/mobility/parking, printed Feb. 23, 2001, 2 pages.

The Evolution of a New Consumerism, Chain Store Age, vol. 73, Jun. 1997, pp. 8-9.

The Federal Transit Administration, TCRP Report 32 Multipurpose Transit Payment Media, Chapter 2 Multipurpose Fare Payment: Overview, p. 10-20.

Stoughton, The Gift of Credit, www.washingtonpost.com/wp-srv/business, Dec. 14, 1998.

Nora Wood, The Power of the Card, Incentive, Jul. 1997, 6 pages.

Stuber, The electronic purse: An overview of recent development and issues, Bank of Canada, Technical Report No. 74, www.bankofcanada.ca, Jan. 1996, printed Feb. 23, 2001, 2 pages.

Understanding the benefits: Smartcity offers a number of important benefits to both the card issuers and their customers, http://www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.vhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Welcome to Card Express CardEx, CardEx website archived by web.archive on Oct. 31, 1996, http://web.archive.org/web/*/http://www.cardex.com, retrieve Oct. 18, 2003, 7 pages.

Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.

Swiftgift, Welcome to Swiftgift, www.swiftgiftcard.com, Dec. 8, 1998, 10 pages.

Kenneth Hein, What's the Deal?, Incentive, Jul. 1998, 7 pages.

Machlis et al., Will smart cards replace ATMS?, Computerworld, printed Feb. 23, 2001, 3 pages.

"In Time of Need: A National Strategy for Disaster Relief Cards," prepared by JPMorgan Chase Treasury Services—Public Sector, Jan. 26, 2007.

Abstract to 2007 JPMorgan Chase Disaster Response Card National Strategy Plan Abstract, Jan. 26, 2007.

A Survey and White Paper of the EBT Industry Council, "Debit and Stored Value Cards for Government: A Growing Trend but States Could Do More," EFTA, Nov. 2006.

Anonymous, Coca-Cola ATM Money Cards, Retrieved from the Internet at: http:—www.cardweb.com-cardtrak-news-cf4_4a_97.html, Apr. 4, 1997, ACS 012.

Siegel, Joel G., et. al., Accounting Handbook, Second Edition (1995).

The State of Arkansas, Arkansas Code of 1987 Annotated (1999).

Authorization of Financial Agent and Terms of Performance, Debit Card Application for Houston, Texas, Sep. 1991, acs00277412.
E-Loan, Auto Loan Rates, retrieved from the Internet on Sep. 30, 2008.
Plotnick, Jennifer, Bakersfield California Investors Explore Buying Rental Property; Apr. 11, 2004.
Board of Governors of the Federal Reserve System - Report to the Congress on the Application of the Electronic Fund Transfer Act to Electronic Stored-Value Products, May 1997, acs00098020.
Cheney, How Effective Were the Financial Saftey Nets in the Aftermath of Katrina, HurricanKatrinaJan06, Jan. 2006.
Haddad, Charles, et. al., Congratulations, Grads—You're Bankrupt; A Marketing Blitz Buries Kids In Plastic and Debt, May 21, 2001.
Hight, Jim, Consulting Services, www.strategies-tactics.com, Oct. 15, 2002.
CardFlash, Cardweb.Com, Daily Payment Card News (2004).
Sherer, Paul M., Deals & Deal Makers: Web Ventures Seek to Facilitate Business Credit, Private Equity, Nov. 8, 1999.
Debit Card News - Paperless Trail Leads Debit to a Check-Free Payroll Program, vol. 3, No. 12, Dec. 16, 1997.
Debit Card Services - Invitation for Expressions of Interest, Jul. 1991, acs00277422.
Direct Payment Card, International EBT Pilot Evaluation Pilot Evaluation - Argentina, Jan. 1996, acs00277456.
Lennox, Graeme, Don't Be Tempted By The Urge To Splurge: Zero Rates Sound Great But You'll Pay Dearly in the End, Jul. 2001.
Wood, John et. al., Wood, et al., Electronic Transfer of Government Benefits, Federal Reserve Bulletin, pp. 203-217, Apr. 1997.
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
Roberts, Leigh, Fnb And Nedcor Launch Into The New Era Of Smart Card Banking; Nov. 15, 1998.
E-Loan, Frequently Asked Questions (2001).
Ostroff, Jeff, Guide to Buying New Cars, Used Cars, Dealer Scams, Feb. 2001, p. 1-7.
Hargreaves, The Evaluation of the Expanded EBT Demonstration in Maryland, Final Report, May 1994, acs00092018.
Hamey, Kenneth, Home Asset Management Accounts Link Mortgages Equity Lines, Oct. 2, 2002.
Request for Information submitted to Department of Health and Human Services by JPMorgan Electronic Financial Services, Request for Information for EBT Services, Aug. 10, 2006.
Alaska Housing Finance Corporation Quarterly Unaudited Financial Statements with Summarized Financial Information for Jun. 30, 2004, and Request for Information Banking Services, Mar. 31, 2005, Bates Nos. ACS-00000143 - ACS-00000231.
Kilian-Kehr, Roger, Kilian-Kehr, Mobile Security with Smartcards, Dissertation, Apr. 8, 2002.
Statement of Brian Kibble-Smith, House Committee on Ways and Means, Apr. 5, 2006.
Lewis, David, Lewis, Mortgage Lending Optimized, InttemetWeek, Issue 858, Apr. 23, 2001.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
Feldman, Judy, Pay by Check Over The Phone Or Net, Oct. 1999.
Youll, James, Peer to Peer Transactions in Agent Mediated Electronic Commerce, Aug. 2001.
Wolf, Harold A., Personal Finance, Sixth Edition, (1981).
Sessums, Community Investments, vol. 9, No. 4, (1997).
Rossman, Kenneth, Summary Appraisal of Real Property, Feb. 15, 2002.
American Bankers Association, The Bank Credit Card Business, (1996).
Nilson, H. Spencer, The Nilson Report, Nov. 1998.
Anonymous, Two Chips Can Be Better Than One May 2001.
Yee, Bennet, Using Secure Coprocessors, May 1994.
Vivo Tech, ViVOtech, Inc. RF-Based Contactless Payment: A more convenient way to pay, White Paper - Version 2.0, Apr. 2004.
Bowen, Cathy, Welfare Agencies Seek Aid From Smart Cards, p. 74, Oct. 2002.
Wells Fargo Blazes New Trail for Homeowners, Oct. 2002.
Wenninger et al., The Electronic Purse, Current Issues in Economics and Finance, vol. 1, No. 1, Apr. 1995, acs00098037.

* cited by examiner

Business Impact Rating

| Customer | Financial |
|---|---|
| [2 = 11% - 20%] 237 | [0 = N/A] 252 |
| Customer Impact relates to the quality of service to existing customers disaster situation. There may be intangible losses related to the degradation of service qualit which will not be apparent immediately but,may create a significant financial impact in relati to the duration of the outage. | Finanacial Impact relates strictly to financial losses, which are a result of not providing business functions/services within certain time-frames |

| Time Frame | Regulatory |
|---|---|
| [1 = Intra - day] 242 | [0 = N/A] 257 |
| What is the allowable delay of service is for each business function/service, using the following time-frames? | Regulatory/Legal impact relates to obligations with agencies, organizations and customers to which the Business Unit must comply. This includes compliance with governmental and industry regulations, contracts and service level agreements with customers, vendors, and outside agencies. |

| Internal Service | Industry Competition |
|---|---|
| [4 = 24 Hrs] 247 | [0 = N/A] 262 |
| Internal Service Agreement impact relates to the responsibilities of the Business Unit to other areas of the Corporation (e.g as a service provider). | Industry/Competitive Edge relates to the r situation would have on the Business Unit's m the reputation of the corporation. |

Dropdown values visible:
0 = N/A
1 = 1% - 2%
2 = 3% - 5%
3 = 6% - 8%
4 = 9% - 10%
5 = > 10%

The Department Rating is: Critical

[Compute Impact Rating] 265

*Note: Only define continuity resources if calculated Impact Rating is Critical.*

FIG. 4

PRIMARY ROLES

| Role | Assigned by | Date Assigned | Assigned to | Date Accepted |
|---|---|---|---|---|
| Information Owner | Owner | 2002-08-13 10:58:46.0 | Owner | 2002-08-13 10:58:46.0 |
| Information Risk Manager | Owner | 2002-08-13 10:58:46.0 | Owner | 2002-08-13 10:58:46.0 |
| Legal Manager | Owner | 2002-08-13 10:58:46.0 | Owner | 2002-08-13 10:58:46.0 |
| Operations Risk Manager | Owner | 2002-08-13 10:58:46.0 | Owner | 2002-08-13 10:58:46.0 |
| Relationship Manager for OSP | Owner | 2002-08-13 10:58:46.0 | Owner | 2002-08-13 10:58:46.0 |
| Data Privacy | Owner | 2002-08-13 10:58:46.0 | Owner | 2002-08-13 10:58:46.0 |
| Financial Manager | Owner | 2002-08-13 10:58:46.0 | Owner | 2002-08-13 10:58:46.0 |
| Sourcing Manager | Owner | 2002-08-13 10:58:46.0 | Owner | 2002-08-13 10:58:46.0 |
| External Connectivity Manager | Owner | 2002-08-13 10:58:46.0 | Owner | 2002-08-13 10:58:46.0 |

ALTERNATE ROLES

| Role | Assigned by | Date Assigned | Assigned to | Date Accepted |
|---|---|---|---|---|
| Information Owner | Owner | 2002-08-13 10:58:46.0 | Owner | 2002-08-13 10:58:46.0 |
| Information Risk Manager | Owner | 2002-08-13 10:58:46.0 | Owner | 2002-08-13 10:58:46.0 |

FIG. 6

| APPLICATION DEVELOPMENT | | | | |
|---|---|---|---|---|
| Question | Yes | No | NA | Comments |
| Is there a process in place to ensure that malicious code is not introduced into a JPMorgan Chase system? If yes, please provide this process. | | | | |
| Has the vendor attained industry-standard (e.g., ISO 9000, SEI CCM) certification? If yes, please provide the certification information. | | | | |
| Is a copy of all source code and documentation under development made periodically and stored at a JPMorgan Chase facility? If yes, please provide this process. | | | | |

FIG. 7

| Plan | Yes | No | N/A | Comments |
|---|---|---|---|---|
| *Has the business continuity plan been tested within the past 12 months? If yes please indicate the date(s).* | | | | 🗓 |
| *Has the next business continuity test been scheduled within 12 months of the previous exercise? If yes please indicate the date(s).* | | | | |
| 1. Has an alternate site been selected for processing business functions in the event the existing location is unavailable? | ○ | ○ | ○ | 🖨 |
| 2. Is a business continuity plan documented for the resumption of the business and service delivery at a different location or in a different location or in a way than normal? | ○ | ○ | ○ | 🖨 |
| 3. Does the business recovery plan provide the information required to react to an event, to resume and continue critical business services/functions, and to ultimately return to business as usual? | ○ | ○ | ○ | 🖨 |
| 4. Does the plan include the documentation of both the business and associated technology requirements? | ○ | ○ | ○ | 🖨 |
| 5. Does the plan account for the loss of critical applications/systems (e.g. data center outage)? | ○ | ○ | ○ | 🖨 |
| 6. Does the plan account for the loss of the primary facility? | ○ | ○ | ○ | 🖨 |

FIG. 8

OSP Communication Strategy

| Name | Employee ID | Cost Center |
|---|---|---|
| Jodi R. Miller | 123456 | 54321 |
| Graham de Gottal | 123456 | 54321 |
| Dianne O'Boyle | 123456 | 54321 |

[Add New Contact]

Back to OSP Steps

600

Add New Contact

605

Name:
Employee ID:
Cost Center:
Primary Work Location:
Primary Work Address:
Primary Work Region:
Primary Work Branch:

[Submit]

Please Select a Category
- Customer Servicing Processes — 655
- Data Destruction and Disposal Procedures — 665
- Data Extraction and Modification — 675
- Development and QA/UAT Environment Processes
- Encryption Practices — 685
- Outside Service Provider Practices
- Related Applications and Processes
- Website Practices 650, 660, 670, 680, 690

| | Yes | No | N/A | Comments/Process |
|---|---|---|---|---|
| Are customer service agents trained to safeguard the information they have access to from social engineering tactics? If so Please attach the procedure / awareness documentation. | ○ | ○ | ○ | 📎 |
| Are customer service agents trained to not to enter sensitive information into comment fields that may not require authorization? If so Please attach the procedure / awareness documentation. | ○ | ○ | ○ | 📎 |
| Are there procedures that define what a customer service agent may deliver from this application to customers and/or employees via the E-Mail contact channel? If so Please attach the procedure / awareness documentation. | ○ | ○ | ○ | 📎 |
| Are there procedures that define what a customer service agent may deliver from this application to customers and/or employees via the Fax contact channel? If so Please attach the procedure / awareness documentation. | ○ | ○ | ○ | 📎 |
| Are there procedures that define what a customer service agent may deliver from this application to customers and/or employees via the Fax contact channel? If so Please attach the procedure / awareness documentation. | ○ | ○ | ○ | 📎 |
| [Submit] [Reset] | | | | |

| Senior Business Executive | Line Of Business | Retail & Middle Market Financial Services Status | | | |
|---|---|---|---|---|---|
| | | Outside Service Provider | Corrective Action Plan | Risk Acknowledgment | Major Control Issues |
| Norman Buchan | Chase Auto Finance | | ● | ● | ● |
| Richard Srednicki | Chase Cardmember Services | ☐ | ● | ● | ● |
| Steve Rotella | Chase Home Finance | ☐ | ● | ● | ● |

FIG. 12

- ● Compliant
- ▲ In Progress
- ◆ Not Compliant with Compensating Controls
- ▼ Not Compliant
- ○ Not Assigned
- ■ Not Applicable
- Ⓢ CAP or Risk Ack. in place
- ● No CAP or Risk Ack. in place

SYSTEM AND METHOD FOR MANAGING RISKS ASSOCIATED WITH OUTSIDE SERVICE PROVIDERS

CROSS REFERENCE TO RELATED APPLICATIONS

This application claims priority to U.S. Provisional Application No. 60/411,284, filed on Sep. 17, 2002 the entirety of which is incorporated herein by reference.

FIELD OF THE INVENTION

The present invention generally relates to systems and methods for managing risk, and more particularly to systems and methods for managing the risk associated with outside service providers.

BACKGROUND OF THE INVENTION

Risk management relates to procedures for assessing and managing risk that are established by the enterprise, with accompanying directives by management to comply with the procedures. For example, a given manager of a department may be required to establish the level of risk associated with the operation of a particular computer system (e.g., the risk of losing use of such a computer system for some period of time). This manager may formulate a system for evaluating and reporting the risk, that can be used by lower level and project managers. For example, on a periodic basis such as quarterly, the managers for a given department might be required to communicate to upper management the various risk factors and risk evaluations that are related to its computer information systems operations. The risk factor related information can be documented through various forms or questionnaires for evaluating risk and risk factors associated with projects for which they are responsible. These forms and questionnaires can be compiled into reports and other summary data to provide a department manager with a fairly good idea of the level of compliance with various enterprise procedures.

Typically, if a group within the department is not in compliance with the established procedures for the enterprise, this information can be so noted in the summary or compiled data presented to the department manager. In such a case, the department manager can establish plans to bring the group into compliance, and to monitor the status of the group in progressing with the plan.

The impact of evaluating the risk for a given enterprise can have serious consequences with regard to the success or profitability of the enterprise. For example, if an enterprise fails to adequately assess the impact of the loss of a particular facility for some period of time, such a loss can catastrophic to the business. In addition, if the enterprise has established procedures that are designed to protect the enterprise from liability, or otherwise assure that levels of risk within the enterprise are minimized, the enterprise can be exposed to tremendous liability if the procedures are not properly followed. For example if the enterprise has contractual obligations that could only be met through the use of a particular facility.

In typical enterprises, the analysis, statuses and reporting to upper management of the procedures with respect to crisis management and business recovery are often haphazard, and inconsistent. For example, some managers may find the requirement of filling out forms and answering questionnaires to be an inefficient use of time, and fail to effectively complete risk assessments. Other managers may take the attitude that 'it can't happen here'. Furthermore, most departments fail to evaluate the external dependencies that it has, and the impact on its ability to perform its functions should those external entities experience a catastrophic event.

One of the significant risks corporations face that is associated with external dependencies is the reliance on Outside Service Providers (OSP). As more and more corporations are outsourcing part of their operations, the reliance on such OSPs is growing. One of the more prevalent areas of such outsourcing is in the area of software application development, maintenance, operation and security monitoring services. OSPs are often asked to process and store company critical and confidential data. In accessing the risk to the corporation, the impact of the failure of an OSP to provide the contracted for services must be an integral part of the corporation's risk assessment methodology.

Where tools for these types of risk assessments do exist, they tend to be form intensive, and inconsistent between various enterprise locations. It is difficult to track and maintain the data that can be obtained from forms related to assessment of risk, and even more difficult to take an enterprise view of such risk, which is absolutely required for major disruptive events. Most such tools are paper based, which clearly are inadequate during an actual event and are similarly inadequate in recovering from such an event. For OSPs, the assessment task is even more complicated as the policies and procedures followed by the OSP must be assessed.

Some computer based systems have been developed to overcome the difficulties with traditional paper based risk assessment systems. It does not appear that any such systems have been developed with respect to assessing and containing the risk associated with OSPs.

SUMMARY OF THE INVENTION

The present invention is a system and method for assessing the risk associated with OSPs. In the preferred embodiment, an OSP is a outside organization that has been retained to process or store information for the enterprise, provide production support or maintenance, provide security monitoring services, provide call center services, or develop applications and/or systems. OSPs are also referred to as "third party service providers" or "external service providers." Although the above list of services are those provided by OSPs in the preferred embodiment, the present invention is clearly applicable to OSPs that provide other services. The system and method of the present invention provides the capabilities to manage and monitor the various components of an onshore/offshore Information Security program. This invention enhances current processes to provide a decision engine around key issues providing the capability for enhanced, monitoring and management around the risk management capabilities of the OSP.

A first step of the present invention is to create a core repository that manages, monitors and measures all OSP assessments across an institution (e.g., a corporation). The invention eliminates redundant systems and functions related to OSP assessment within each of the Lines of Business (LOBs) of the institution.

The present invention utilizes a six-step OSP management system to develop, assess and test the risk associated with the OSPs employed by a corporation. The system identifies and tracks outstanding issues related to the OSP through final resolution or acceptance of the risk posed by the OSP issue. The system and method employs automated questionnaires that require responses from the user (preferably the manager of the OSP relationship). The responses are tracked in order to evaluate the progress of the assessment and the status of the OSP with respect to compliance with the enterprise's requirements for OSPs. One or more responsible parties for a given area are identified or appointed to be responsible for responding to compliance questionnaires. The parties fill in questionnaires designed to focus on various features of risk assessment for specific aspects of the operation of an OSP. For example, the responsible parties for an area that contracts for data storage by the OSP would be asked assess the OSP preparedness in the case of a disaster (e.g., a fire). The rating for disaster recovery readiness may depend upon such factors as whether information is stored off site on a regular basis, intervals in which system backups are made, robustness of computer recovery systems and so forth.

Once a questionnaire has been completed, the OSP can be given an overall rating of exposure to various forms of risk. Areas of risk can be acknowledged, prompting a sensitivity rating, such as severe, negligible and so forth. Once risk is acknowledged, a plan for reducing the risk or bringing the OSP into compliance can be formulated, and progress towards compliance can be tracked. Alternatively, an identified exposure to risk can be disclaimed through the system, which requires sign off by various higher level managers and administrators.

Once risk assessment is completed for various OSPs, a higher level manager can review exposure to risk on a broad perspective, and through a user interface, expand particular areas where high risk is identified as a problem. A risk category that is expanded reveals the different departments and/or projects which use OSPs and their associated risks or compliance statuses. The higher level manager can thus identify particular projects, activity areas and/or OSPs where risk exposure exists.

The sensitivity of the risk factors can also be gauged and used to develop an overall risk rating. For example, a person responsible for assessing the risk related to a particular OSP is asked to rate the sensitivity of various hypothetical events such as competitive disclosure, financial loss or impact on perception of customers.

Requirements for compliance with regulatory demands and regulatory agencies are built into the OSP risk management tool. Project managers and higher level managers can determine in a glance if a particular OSP's practices and procedures are in compliance with regulatory guidelines. Higher level managers have broader access than lower level mangers to risk assessment information according to level of seniority. For example, a middle level manager can see all the risk assessment factors for each OSP relationship that they manage, but can see no risk information beyond their allotted level. A high level manager can view all the information available to the mid level manager, in addition to any other manager or group for which the high level manager has responsibility. Accordingly, access to the system is provided on a secure basis that is reflective of the user's level of seniority.

The system also provides security features such as logon IDs and passwords. Access levels are assigned based on seniority or management status, and provide a mechanism for a secure review of risk exposure and compliance. Once data is entered into the system it cannot be modified unless the user has proper authorization. The system generates reports to inform persons or groups about their compliance status. A search tool is available for locating various OSPs, business units, compliance areas, risk status levels and so forth. The system can also be used for training users on risk management policies, how risks are evaluated and how paths to compliance can be determined.

The system according to the present invention thus provides immediate compliance verification, a calendar of events, allows shared best practices and corrective action plans and provides a mechanism for risk acknowledgement communicated to other members of a hierarchy. The system can be used in any hierarchical organization including such risk sensitive enterprises as military units, space missions and highly financed business endeavors.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 4 illustrates the impact assessment interface;

FIG. 6 depicts Roles and Responsibilities interface;

FIG. 7 is an OSP review interface with respect to application development;

FIG. 8 illustrates the OSP continuity preparedness review interface;

FIG. 9 illustrates the contact interface;

FIG. 10 depicts a Privacy interface;

FIG. 11 illustrates a State of Health Report Card status screen;

FIG. 12 illustrates a legend to the icons depicted in FIGS. 11 and 13; and

DETAILED DESCRIPTION OF THE INVENTION

Figure 1:
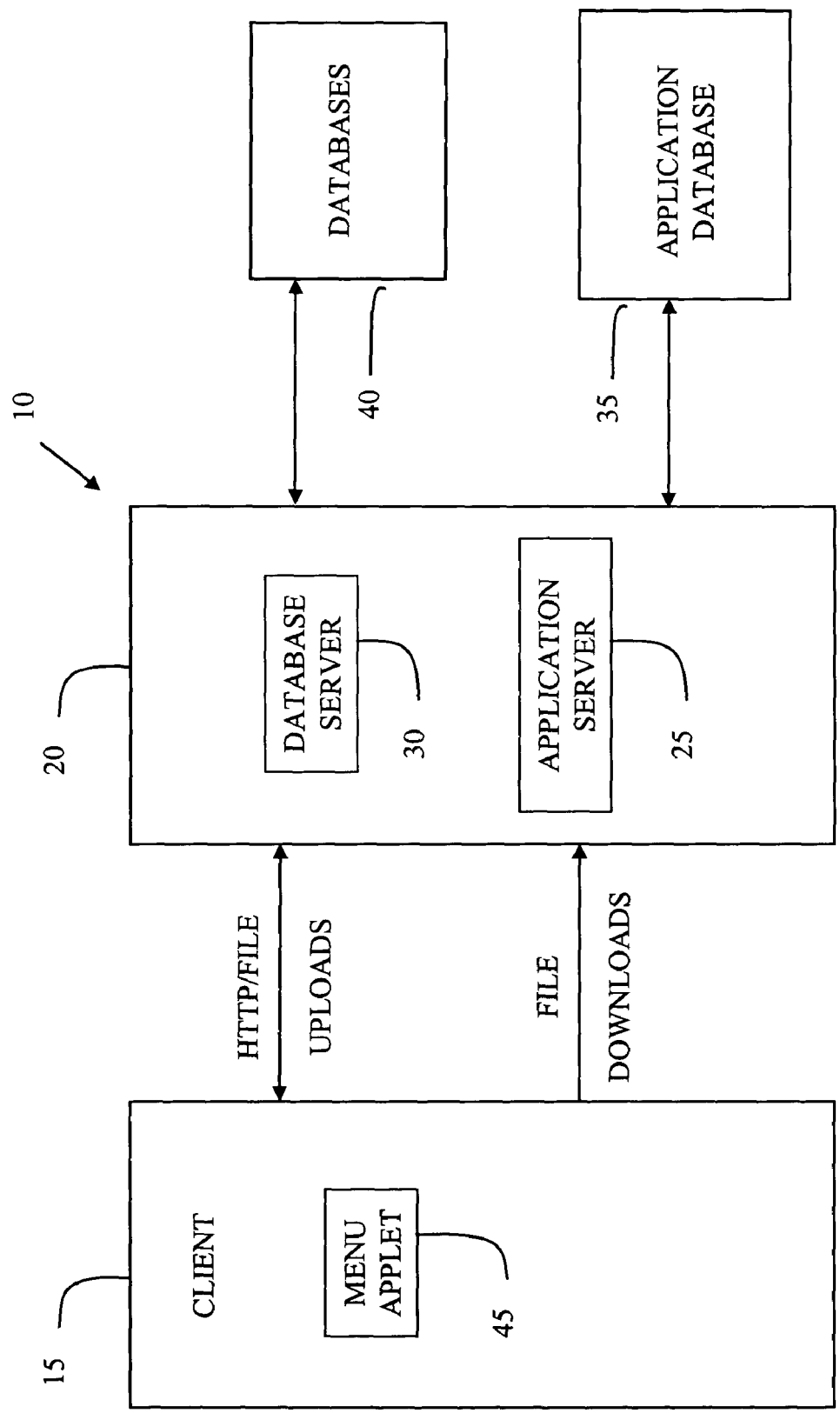
FIG. 1 illustrates the system of the present invention.

The system 10 of the present invention is illustrated in FIG. 1. As illustrated, system 10 is implemented using a distributed client/server architecture. The clients 15 (one illustrated) are distributed throughout the enterprise (corporation), while the servers 20 are centrally located with redundancies (not illustrated). This infrastructure consists of one application server 25 communicating with application database 35, and one database server 30 communicating with database 40. In a preferred embodiment, the application server 25 is running BEA WebLogic 5.1 that comprises middleware between the front-end web application and the application database 35. In this preferred embodiment, database server 30 is running Oracle 8.16 Server and database 40 is an Oracle database.

In the preferred embodiment, client 15 is a web based browser application. This application 15 preferably uses browsers that support Java applets and JavaScript such as Netscape 4.x or Internet Explorer 4.x. Menu applet 45 is an illustration of a Java applet supported in client 15.

Figure 2:
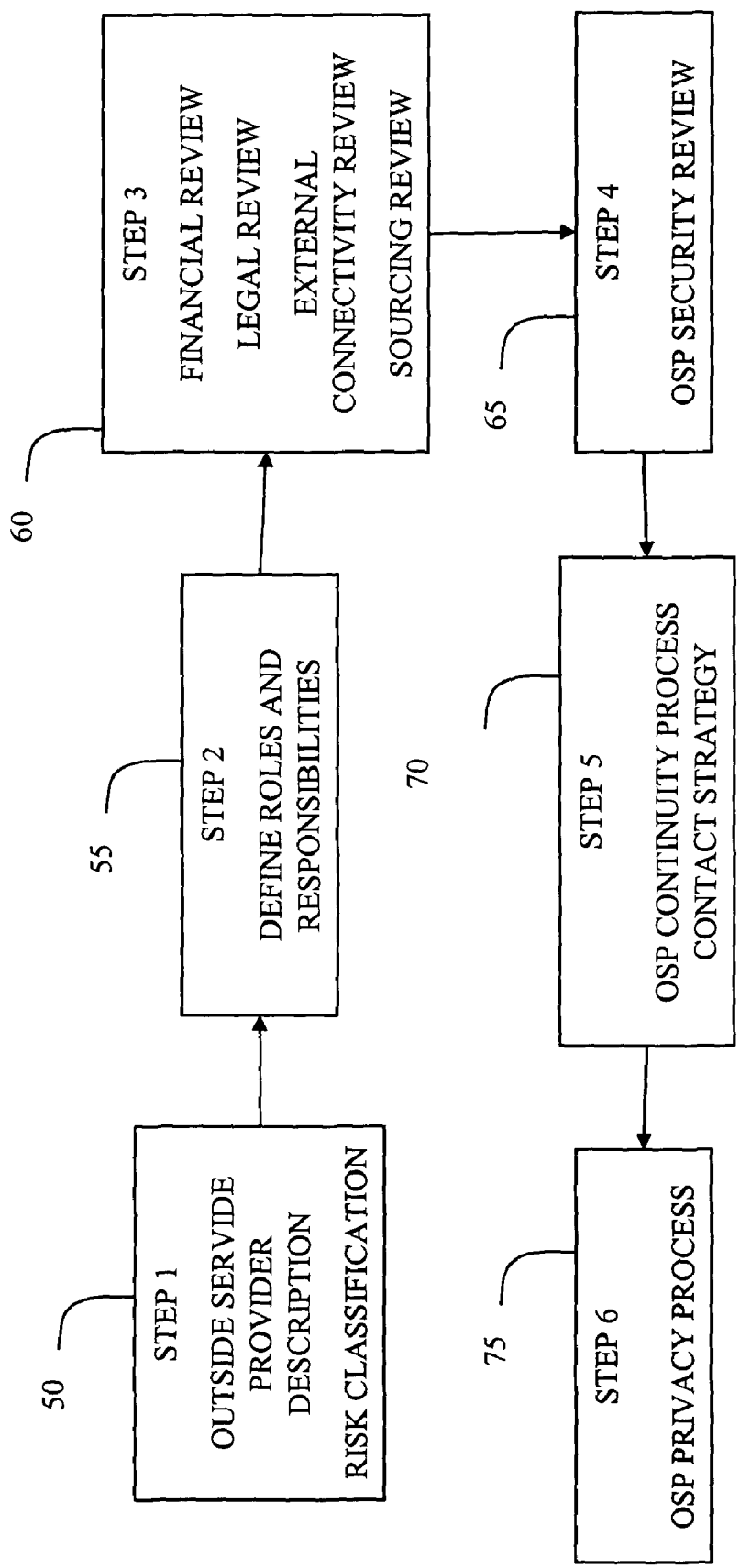
FIG. 2 depicts a high level view of the process of the invention.

FIG. 2 broadly describes the six step method of the present invention. The method enables tracking of OSPs across the enterprise and the six-step map provides for consistency and standardization for OSP review and risk assessment throughout the organization. The six step method further provides for a comprehensive understanding of the OSP's business resiliency components, information security alignment and privacy disciplines. The present invention matches those key elements to the needs of key business functions across the Lines of Businesses. Gaps identified by the system of the present invention in this analysis are tracked and monitored by the information security team for the enterprise using the system of the present invention.

In step one (50) the person assigned with the responsibility to assess a particular OSP describes the OSP and the resources (e.g., software applications or data) accessed or supported thereby. The responsibility for describing the OSP is typically assigned to the manager in charge of the relationship with the OSP, as this is the person in the organization with the most intimate knowledge about the current state of the operation of the OSP at any given time. As further described below, the information for each OSP is aggregated and rolled up for each higher level of management with the organization. In the second half of step one (50), the user assesses the business risk and the country impact risk associated with the particular OSP. In step two (55) of the process, various roles and responsibilities within the enterprise are defined and assigned. In step three (60) of the method, the OSP and the enterprises relationship with the OSP is reviewed with respect to the finances of the OSP, the contractual relationships with the OSP (and compliance therewith), the sourcing of the OSP contract and the controls in place in regard to external connectivity and dependencies on external systems that are not controlled by the enterprise. In step four (65) all of the security practices and mechanism of the OSP are reviewed. In step five (70) of the method, the procedures of the OSP in the event of an interruption in its business (e.g., a natural disaster) are reviewed to insure continuity of the service to the enterprise. In step five, key contacts within the enterprise as well as the within the OSP are identified. Finally, in step 6 of the process, the privacy policies of the OSP are reviewed to insure compliance with the privacy policies of the enterprise (e.g., with respect to the collection and retention of sensitive data).

Figure 3:
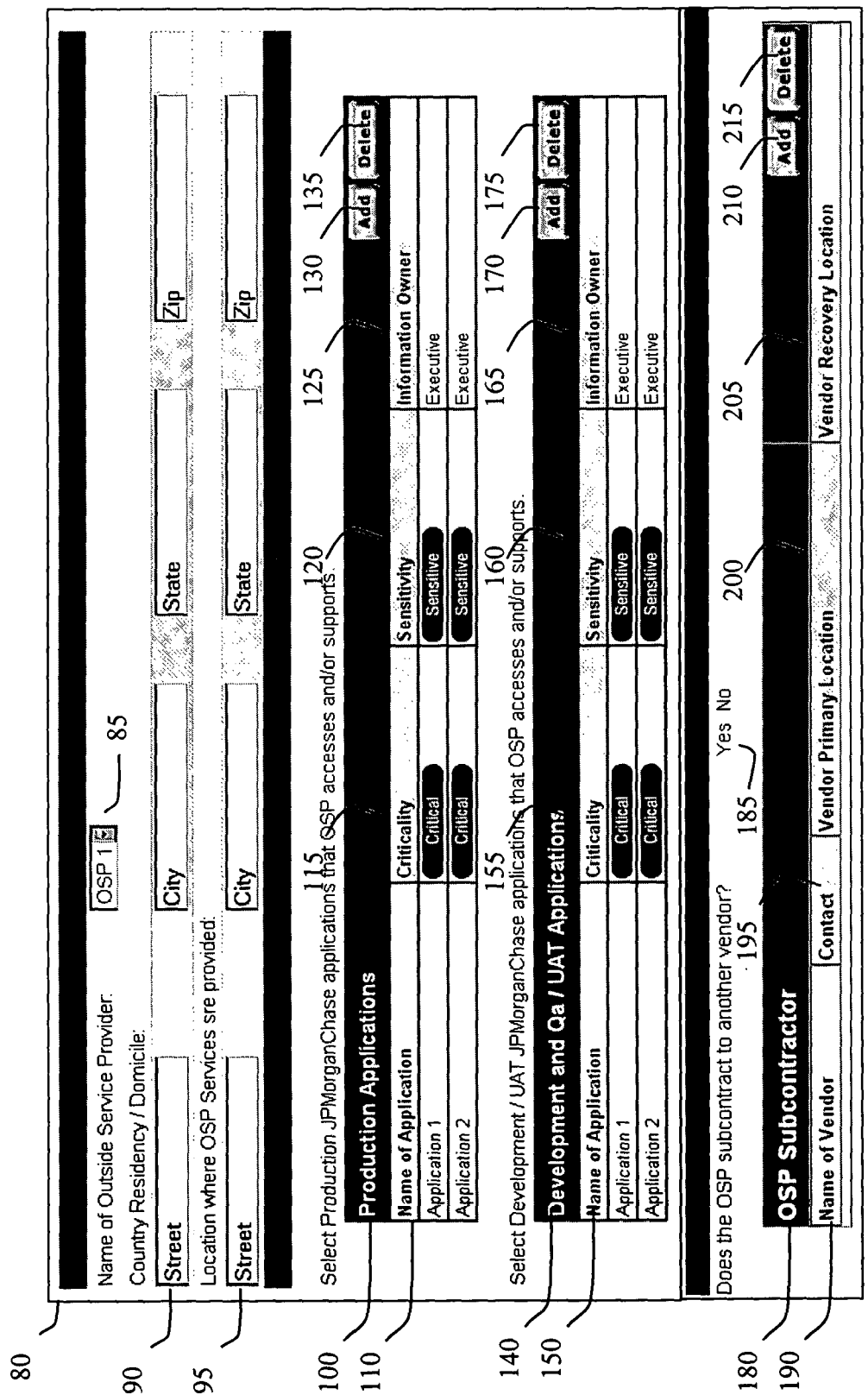
FIG. 3 is the interface of system 10 for describing an OSP.

FIG. 3 illustrates an input screen 80 employed by the user to describe the OSP. Much of the description contained herein is made in terms of the user interface screens (e.g., input screens) illustrated in the Figures. Further description herein relates to the processing of the information illustrated in these screens by the hardware components of system 10 illustrated in FIG. 1. As appreciated to those skilled in the art, the description of these screen and the accompanying description of the processing allows one to make and use system 10.

Screen 80 is used to input into system 10 the descriptions of as many OSPs as are required. In field 85, the user identifies the OSP by name. A dropdown box is provided for field 85 so that the user can recall the data for a previously identified OSP and edit the information associated with that OSP is necessary (e.g., an address change). Field 90 is used to identify the location of the OSP, preferably by Street, City, State and Zip Code. OSPs are preferably defined by one specific location. If an OSP has multiple locations, the OSP is preferably identified by the address where the OSP review was conducted. Field 95 is used to identify the specific location at which the OSP is providing services to the enterprise. Again, this location is preferably identified by Street, City, State and Zip Code.

In area 100, the manager identifies the production applications of the enterprise that are supported by the OSP being reviewed. As known to those skilled in the art, a production application is an application that is actively being used by the enterprise in it's business. For each application, the user identifies the name of the application 110, the criticality of the application to the enterprise 115, the sensitivity of the application 120, and the name of the owner 125 of the information (data) associated with the application. In order to assist the user with the input of the application name, area 100 is provided with an ADD button 130. This ADD button causes a drop down list to be displayed that lists the production applications of the enterprise. In a preferred embodiment, the applications identified in the dropdown list are automatically supplied from the software application within the enterprise that performs configuration management of all of the enterprise's applications. If an OSP is no longer associated with a production application, area 100 provides a DELETE button 135 for removing the production application.

The criticality 115 of the production application is determined by the business impact of the loss of the use of the application. The criticality 115 of the application is further described with respect to FIG. 4 below. The sensitivity 120 of the application is determined with respect to whether the application processes data considered to be private (e.g., Social Security numbers). In field 125, the user inputs the person responsible for ownership of the application, typically a manager in the enterprise.

In area 140, the user identifies the applications of the enterprise that are under development or under test that are supported by the OSP being reviewed. As with the production applications, for each application under development or test, the manager identifies the name of the application 150, the criticality of the application to the enterprise 155, the sensitivity of the application 160, and the name of the owner 165 of the information (data) associated with the application. Again, area 140 is provided with an ADD button 170 to assist the user in inputting the application into the system. Similarly, area 140 provides a DELETE button 175 for removing from the risk assessment system the development or test applications previously entered.

As with the production applications, the criticality 155 and sensitivity 160 of the application under development or test is listed. In field 165, the user inputs the person responsible for ownership of the development application, typically a manager in the enterprise.

In area 180, the user identifies whether the OSP uses a subcontractor (another vendor) to assist in the provision of services to the enterprise. The YES/NO buttons 185 are activated to indicate the answer to this question. If the OSP does use other vendors, the user is required to describe the vendor, similar to the description used for the OSP itself. As with the other areas 100 and 140, area 180 for vendors provides ADD 210 and DELETE 215 to assist the user in adding and deleting vendors in the database 40 (see FIG. 1). The manager identifies the name of the vendor in area 190. In area 195, the manager input the name of the contact at the vendor as well as other information related to the contact (e.g., phone/fax/cellular numbers). Although the information collected and analyzed with respect to the vendor is less as extensive than the information collected about the primary OSP, the system does collect the primary location of the vendor 200 and its backup/recovery location.

The primary location 200 is where the vendor primarily supplies its services. In the case that the use of the primary location is lost, area 205 identifies where the vendor would conducts its backup operations. Some vendors (and OSPs) may not have a backup location. The presence or lack of a backup location factors into the system's assessment of the risk associated vendor and/or OSP. Depending on the criticality of the services provided by the vendor and OSP, the lack of a recovery location may cause the system to determine that the risk associated with the vendor and OSP is unacceptable. Further discussion with respect to the continuity of the OSP services (e.g., primary and recovery locations) is discussed below in connection with FIG. 8.

Once the manager has described the OSP to the system 10 as illustrated in FIG. 3, she must then make an assessment of the relative criticality of the services provided by the OSP. Although all managers inherently believe their daily operations (i.e., supervision of the OSP relationship) are critical to the success of the organization, the system and method of the present invention attempts to take the subjectivity out of this assessment to the extent practicable. System 10 does so through a series of individual assessments, from which an overall impact rating services provided by the OSP can be derived. System 10 enables corporations to assess criticality via a comprehensive information technology impact analysis. The classification focuses on loss of customer service, loss of revenue or increased operational expense, regulatory and legal penalties stemming from contractual obligations, loss of services among internal partners, and loss of competitive edge specific to visibility and industry edge. These individual impact assessments are illustrated in FIG. 4. FIG. 4 specifically illustrates an input screen 230 that a manager can use to assess the impact if the OSP ceases to provide its services for some period of time.

The first impact rating 235 relates to the impact of the OSP under assessment with respect to the organization's customers. Specifically, the Customer Impact Rating 235 asks the manager to assess the impact in the quality of service to existing customers of the enterprise if the OSP fails to provide its services. The assessment 235 notes that there may be intangible losses related to the degradation of service quality which will not be apparent immediately but, may create a significant financial impact in relation to the duration of the outage of the services from the OSP. List box 237 allows the user to view all of the available choices by which to answer the Customer Impact Rating 135. These possible answers include: "0" for not applicable (in the case where the OSP provides services to internal only organizations); "1" for where the manager believes there would be a 1 to 10% decrease in the quality of service provided to the customers if the OSP's services fail; "2" for where the manager believes this degradation would be 11 to 20%; "3" where the envisioned degradation is 11-30%; "4" for a degradation of 31-40%; and rating of "5" where the degradation of the impact on the customer is greater than 40%. The specific ranges identified for responses for this field are presently preferred, and it is readily appreciated that these ranges can be modified to suit a particular business and/or objective. The Customer Impact Rating 235 relates to the quality of service to existing customers during a disaster situation. Again, there may be intangible losses related to the degradation of service quality, which will not be apparent immediately but, may create a significant financial impact in relation to the duration of the outage from the OSP.

Time Frame Rating 240 asks the manager for the allowable delay of service from the OSP. The first option available for the manager to choose in list box 242 is "More than one week'. This indicates that the services from the OSP do not have to be back up and running in any time-frame greater than the one week definition. The remainder of the impact ratings with respect to Time Frame Impact include: "1" where the OSP must resume operations within one week, (e.g., between days 3 and 7); "2" for 48 hours where it is acceptable to have OSP services resumed by the start of the business unit's second business day; "3" 24 hours, where the operations of the OSP must be resumed by the start of the business unit's next business day; "4" Intra-day, where resumption of the OSP's operations can take place before the end of the business unit's business day. (i.e. 4 to 8 hours); and "5" Immediate, where the operations of the OSP must resume within 4 hours. The specific ranges and choices identified for responses for this field are presently preferred, and it is readily appreciated that these ranges can be modified to suit a particular business and/or objective.

Internal Service Agreement impact 245 relates to the responsibilities of the business unit which employs the OSP to other areas of the Corporation (e.g., as a service provider itself). For example, the department providing help desk services for internal applications would be a service provider to other departments in the organization. Some or all of the help desk functions could be outsourced to an OSP List box 147 provides the user with the range of available ratings which includes: "0" for not applicable (in the case where the department is not an internal service provider). The other acceptable choices for input into Internal Service Agreement impact 245 field are defined in terms of a time frame. The Time Frame Rating field 240 described above is a determination of how quickly the corporation needs to have available each particular business function/service. The Internal Service Agreement impact field 245 relates to the responsibilities of the department to other areas of the enterprise (e.g. as a service provider).

The other available ratings for input into Internal Service Agreement impact field 245 include: "1" 1 WEEK; "2" 1 WEEK; "3" 48 HRS.; "4" 24 HRS.; and "5" INTRA DAY. The specific ranges and choices identified for responses for this field are presently preferred, and it is readily appreciated that these ranges can be modified to suit a particular business and/or objective.

Financial Impact 250 relates strictly to financial losses, that would be a result of not providing business functions/services within certain time-frames. The timeframe for the calculation of the financial loss is preferably based upon a thirty (30) day outage. The selections in list box 252 include: "0" for N/A; "1" if the financial impact is estimated to be less than $500,000; "2" if the loss is between $500K and $1 million; "3" for expected losses of $1M to $2.5 M; "4" for losses of $2.5M to $5M; and "5 for estimated losses of greater than $5M. The specific ranges and choices identified for responses for this field are presently preferred, and it is readily appreciated that these ranges can be modified to suit a particular business and/or objective.

Regulatory/Legal impact field 255 relates to obligations with agencies, organizations and customers that have laws, regulations or rule with which the user's business unit must comply. This includes compliance with governmental and industry regulations, contracts and service level agreements with customers, vendors, and outside agencies. List box 257 enables the user to select from several impacts that describe the legal or contractual penalties that would result from non-compliance by the department due an interruption in the business. These ratings including: "0" for N/A; "1" for a $50,000 penalty; "2" for a $50K to $100K penalty; "3" for a $100K to $500K penalty; "4" for a $500K to $1 million penalty; and "5" for a penalty of greater than one million dollars. The specific ranges and choices identified for responses for this field are presently preferred, and it is readily appreciated that these ranges can be modified to suit a particular business and/or objective.

Industry/Competitive Edge impact rating 260 relates to the effect a disaster situation would have on the particular business unit's market position and the reputation of the corporation. List box 162 gives the user the following choice for the estimated amount of impact on the market position and corporate reputation: "0" for N/A; "1" for 1 to 2% of an impact; "2" for 3 to 5% impact; "3" for 6 to 8% impact; "4" for 9 to 10% impact; and "5" for any estimated impact greater than 10%. The specific ranges and choices identified for responses for this field are presently preferred, and it is readily appreciated that these ranges can be modified to suit a particular business and/or objective.

Once the user has provided an impact assessment for each of the six categories described above (235, 240, 245, 250, 255 and 260), the user clicks on button Calculate Impact Rating 265 in order to calculate the overall impact rating of the OSP. System 10 computes criticality rating for the OSP from the number input by the manager in the categories described above. The analysis process results in a rating of 0 to 5 (low to high criticality), for each of the impact criteria. A determination of a "summary" rating is based on the highest criticality rating of the individual impact criteria. The Department Rating is: Critical (if any rating is 3, 4 or 5) or Non-Critical (if all ratings are 2 or less). The specific algorithm used to analyze the overall criticality of the department (in light of the manager's assessment) is subject to the goals of the business. For certain types of businesses, certain departments that use OSP resources will be more critical than others. For example, the restoration of the MIS department will be much more critical to a financial services business than it will be to a steel manufacturer.

The above described procedure for determining the criticality of an OSP can, and is preferably performed for the vendors identified in system 10 (see FIG. 3). As previously described, the criticality of the OSP's services is cross-referenced in the OSP description screen 80, FIG. 3, in fields 115 (for OSPs) and 155 (for vendors). The criticality of the OSPs and vendors is stored in database 40 in association with the data of the particular OSP or vendor.

Figure 5:
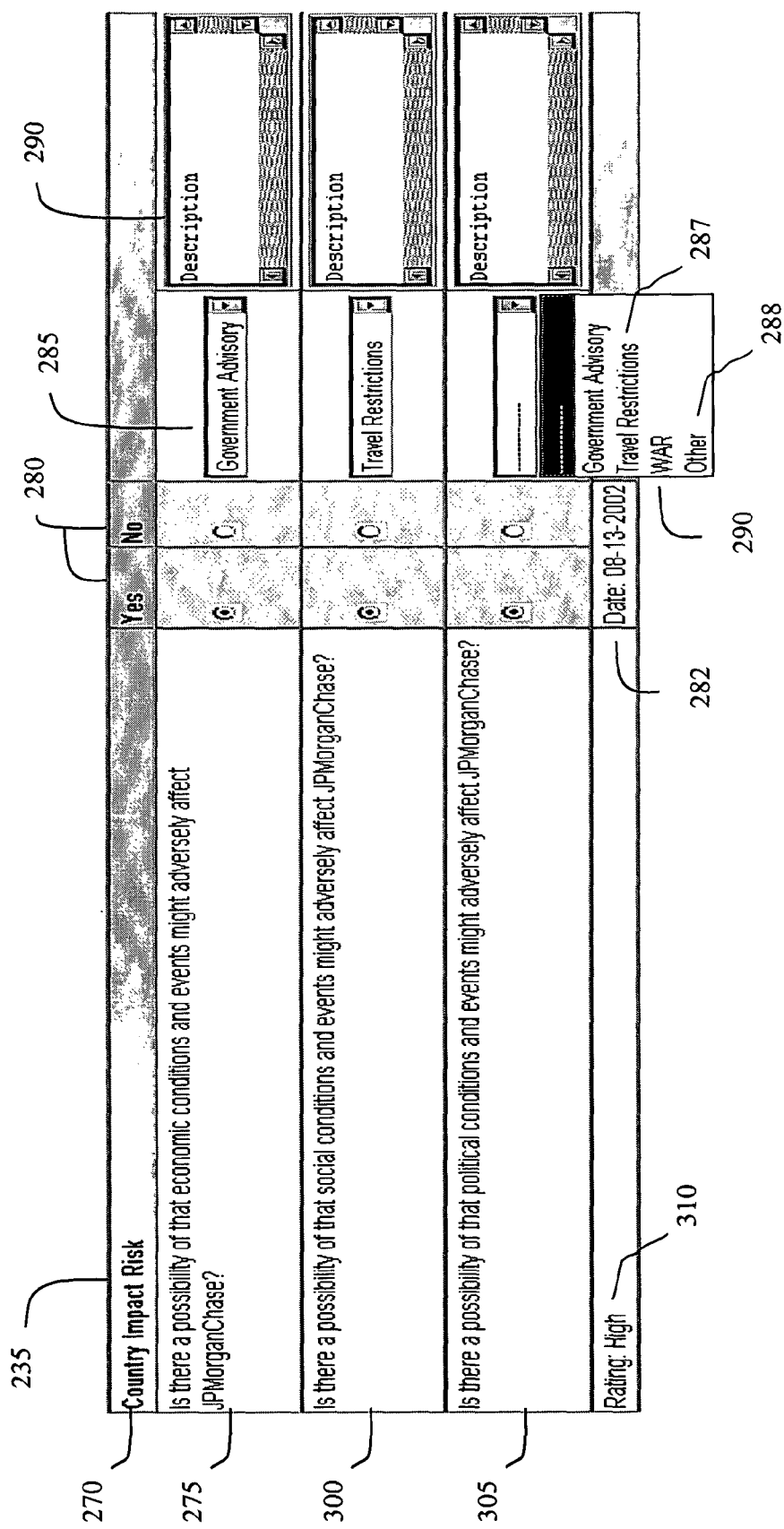
FIG. 5 illustrates the Country Impact interface.
Figure 13:
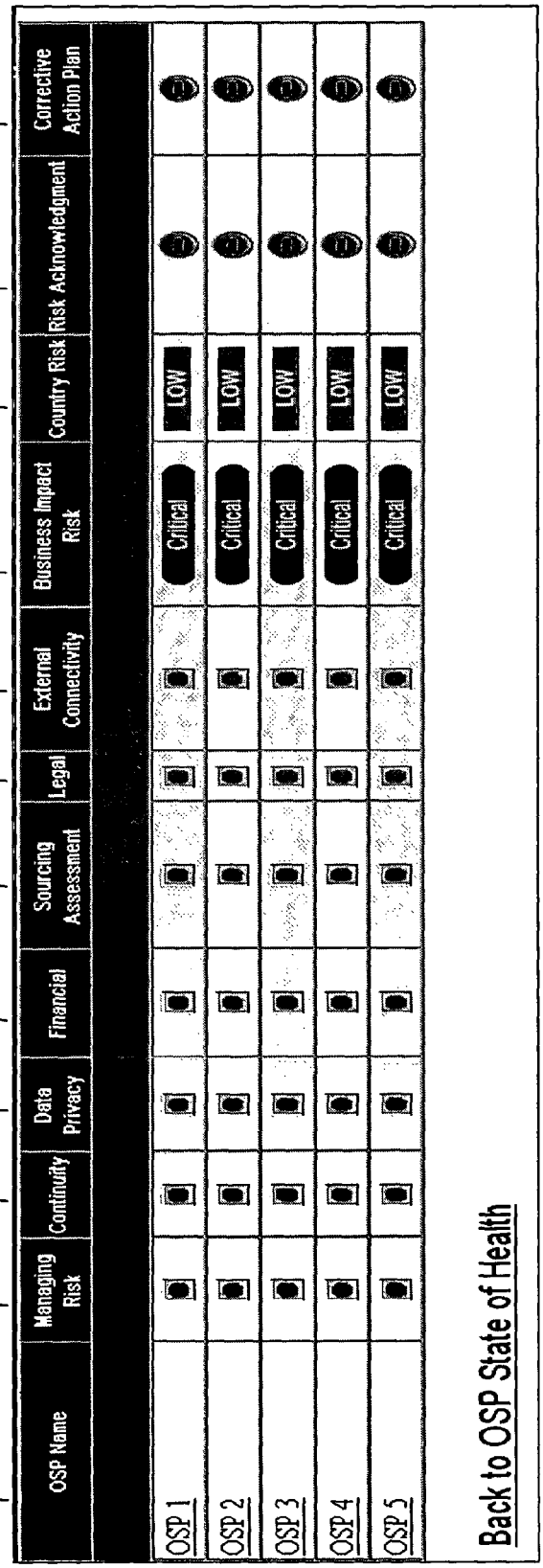
FIG. 13 is a detailed State of Health Report Card status screen.

In addition to the business impact rating for the OSP, the risk classification of step 1 (FIG. 2) also requires an assessment related to the countries in which the OSP operates. More and more, corporations are relying on OSPs that are located in countries foreign to the location of the enterprise. For example, a corporation with operations based in New York hires a software development firm in India and outsources its help desk operations to a firm in Ireland. The Country Impact Risk screen 270 asks a series of questions of the user with respect to the country in which the OSP primarily operates. In question 275, the manager is asked if there is a possibility of economic conditions and events within that country that would adversely effect the enterprise. One example of such a condition or event is a collapse of the equity markets in the country In fields 280, the user indicates whether the possibility of such conditions or events exist in the country. As shown in field 282, this determination of the user with respect to the conditions and events in the country is date stamped. It is appreciated that the conditions and events in any country are subject to daily changes, so the date of a particular determination should be tracked. If the answer to the determination is yes, there are conditions and events that would adversely impact the enterprise, the user inputs, in field 285, the source of the information on which the determination was made. For example, in field 285 as illustrated in FIG. 5, the adverse information might have come from a Government Advisory. The adverse information could also relate to a Travel Restriction 287, news of a war 288, or from another source 290. Field 295 allows the user to input any additional and/or detailed information regarding the answer to the question. For example, the user may further describes the source of the adverse information. In area 295, the user may paste an electronic document containing the Government Advisory, or provide a link to the Advisory.

FIG. 5 illustrates two more such country impact questions 300, 305. Question 300 asks if there is a possible social condition or event that would adversely impact the enterprise. An example of a social condition might be a concern is the rise of terrorism in the country that results in travel restrictions to and from the country. The user employs fields 280, 285 and 295 to supply system 10 with the requested information in regard to the question. Question 305 asks a similar question with respect to the political conditions and events. An example of a political condition might be a change in the government of the country to a more socialist administration.

Based on the answers to the questions in screen 270, system 10 make determination of a rating 310 of the conditions in the country. The rating 310, either LOW or HIGH risk, is automatically computed by system 10 based upon the responses. The specific algorithm used to determine the overall risk associated with the country can be dependent on the risk tolerance of the business. The data associated with the country impact questions and the country rating are stored by system 10 in database 40 (FIG. 1). Links and cross references to the Country Impact data are additionally made the records of the OSPs and vendors conducting operations in that country.

In step two of the process of the present invention (FIG. 2), the Roles and Responsibilities with respect to the operations of the OSP are identified and input into system 10 for storage in database 40 (FIG. 1). The identification of the roles and responsibilities with the corporation with respect to the operation of an OSP is a very important exercise. Without clearly defined roles and responsibilities and specific employees of the corporation assigned these roles and responsibilities, the risks associated with the operation of the OSP can go undetected.

FIG. 6 illustrates an input screen 350 for assigning personnel to the respective roles. This Figure illustrates nine different roles to be fulfilled with respect to the supervision and assessment of an OSP: Information Owner 380; Information Risk Manager (IRM) 385; Legal Manager 390; Operations Risk Manager 395; Relationship Manager for the OSP 400; Data Privacy 405; Financial Manager 410; Sourcing Manager 415; and External Connectivity Manager 420. Although nine roles are illustrated in FIG. 6 as preferred, additional roles and responsibilities can be defined and assigned using the system of the present invention.

For each of the roles 355, input screen 350 indicates who performed the assignment of the role 360, when the role was assigned 365, to whom the assignment was made 370 and the date on which the assignment was accepted 375. When an assignment is made, system 10 preferably sends the assignee an email notifying the person of the assignment and the responsibilities associated therewith (see below). The assignee preferably accepts the assignment by replying affirmatively to the email and system 10 updates the applicable database to record the assignment. When a manager is making assignments in input screen 350, some of the roles will have already been pre-populated as certain of the assignments relate to firm-wide responsibilities.

The following section describes the responsibilities of key ones of the roles in the present invention.

The Information Owner 380 is a manager in an area which generates or processes system information (e.g., application programs and related files), or produces products and services which depend upon system information. Each application of the enterprise must have an Information Owner 380 accountable for its protection. Applications that are cross-functional in nature, in that they serve the needs of multiple business units, preferably have a central Information Owner 380 that serves as a focal point. Local Information Owners 380 are assigned for every business unit using these applications.

In each case, the Information Owner's 380 responsibilities are the most extensive and include the following relative to OSP: notifying the Information Risk Manager 385 (see below), in writing, of the intent to seek a contract with an OSP; obtaining from the OSP a copy of the OSP's latest third party financial and non-financial audit report, or internal audit report; obtaining documentation describing OSP's procedural, physical access, logical access and business recovery controls; obtaining appropriate Contract and Legal review during the development of the written OSP contract; requiring notification by the OSP of any organization, security-related, or other changes affecting the availability, confidentiality, or integrity of its services; performing an annual self-assessment to ensure continuing policy compliance; initiating the risk acknowledgment process (see below) for all instances of policy non-compliance; developing, or ensuring the development of, an essential business profile, preferably annually; ensuring the development, implementation, annual testing, and maintenance of a contingency plan (see below); assisting the Information Custodian in developing an "Operations Restoration Sequencing Plan"; Identify vital information, and direct when it shall be copied and moved to an off-premise location; certifying vital records as part of the annual contingency test; ensuring that all of the enterprise's information (e.g., application programs and related files) is evaluated through risk assessment techniques; delegating, in writing, day-to-day responsibility for protecting information kept on computer systems to the appropriate Information Custodians; authorizing each user's logical access privileges (including application level) according to business need and maintain evidence of approval until next semi-annual review; communicating access authorizations to the technology security administration and/or business security administration of the enterprise; ensuring that access privileges of terminated/transferred users are revoked as soon as possible; ensuring that access privileges are suspended for users who are on leave-of-absence or extended disability; approving the use of specialized hardware/software which has potential to test for access control weaknesses within a business unit; reviewing access authorization to re-validate the necessity of existing user authorizations; and communicating all suspected or confirmed intrusion attempts to the IRM 385.

The Information Risk Manager (IRM) 385 generally reports to senior management within the enterprise and is responsible for ensuring that the enterprise complies with the enterprises established information and technology control policies. The responsibilities of the IRM 385 includes the following relative to OSP: coordinating compliance with the requirements of the information and technology control policies; maintaining an updated list of OSP used by the enterprise and post updates to the OSP database 40; allocating resources for the OSP review process (i.e., develop appropriate OSP review team); reviewing and evaluate risk acknowledgment forms (see below), and re-evaluate existing risk acknowledgments prior to their expiration; and notifying Auditing of all approved risk acknowledgment forms.

The Legal Manager 390: ensures compliance of regulatory requirements and management of regulatory risk in the region; provides awareness of regulatory requirements to all stakeholders and advice on how to achieve compliance; and reviews vendors' contractual agreement and service level agreements to ensure adequate coverage and provision for regulatory compliance globally.

The Operational Risk Manager (ORM) 395 assists the executives of the enterprise in discharging their responsibilities regarding the management of operational risk.

The OSP Relationship Manager 400 is an employee of the enterprise assigned by an Information Owner 380 to actively manage and monitor the OSP's performance to a service agreement between the OSP and the enterprise.

Screen 350 also allows the user to assign alternates to the one or more of the roles defined as the Primary Role. In the example depicted in FIG. 6, two alternatives were assigned to fulfill primary roles, Information Owner 425 and Information Risk Manager 430. Alternative people have been identify to fulfill these two roles as they are some of the most important relative to the supervision of the relationship with OSPs.

Returning to FIG. 2, in step three (element 60) the manager is required to document various reviews conducted relative to the OSP. An External Connectivity Review is conducted to evaluate the controls within all architectures of the enterprise that involve a significant element of external connectivity or a dependency on external systems not controlled by the enterprise. OSPs necessarily involve external connectivity. A Financial Review is conducted in order to identify the financial stability of the OSP by evaluating the service provider's financial condition. A review of the insurance policies related to the OSP services is conducted to ensure coverage in the case of damages incurred as a result of the cessation of services.

The Insurance Review includes the expiration date of the applicable policies, and the limits of liability contained therein. Some of the applicable policies include: Worker's Compensation and Employee's Liability; Commercial General Liability; Commercial Blanket Bond; and Others—such as automobile liability, motor cargo or armored cargo. A Legal Review is conducted with respect to the contact governing the relationship with the OSP. The review of this contract includes a review of the repository of Non-Disclosure Agreements and Contracts and a review of the enterprise's records to find OSPs that have been rejected for use by the enterprise or have been terminated. A Sourcing Review is conducted to insure that the appropriate due diligence process was employed and completed in the selection of the OSP.

In step four of the process (element 65, FIG. 2), a Security Review is conducted and documented. The process of the present invention provides a standardized methodology for performing on-site reviews and/or to be completed by relevant OSP personnel during the vendor evaluation process. The execution of the on-site review process entails the review of evidence (via inspection and observation) that the control procedures required by the enterprise is being performed by the OSP. Experience has shown that merely engaging in a dialogue related to the control structures that are employed at the OSP is not sufficient to ensure that the control environment is adequate. Inquiry may be sufficient to satisfy general control concerns. But inquiry alone, without inspection and observation, cannot be considered as a comprehensive on-site review. System 10 provides a series of input screens through which the user can provide complete documentation with respect to the security review.

The first series of inputs requested from the user relate to the services being provided by the OSP. The user is preferably presented with a checklist of services that the user can check off the services applicable to the particular OSP undergoing security review. The service choices preferably available for an enterprise in the financial services and banking industry include, but are not limited to: Account Verification and Closure Services; Facility Services; Anti Money Laundering; Financial Technology Services; Application Development; Fraud Management; Application Development—Production; Hardware Maintenance and Support; Application Development—User Acceptance Testing; Hosting; Automated Clearing House; Human Resources Management; Billing; Infrastructure Service Solutions; Business Continuity and Recovery Services; Maintenance; Call Center or Help Desk Management Services; Monitoring; Card Issuance; New Account Marketing; Cardholder Servicing; Operational Support; Change Management; Payment; Check Printer; Payroll Processing; Check Supplier; Promotion; Collection Agency; Professional Services and Support; Content Delivery Network Services; Risk Management; Customer Relationship Management; Software Maintenance and Support; Data Analysis and Reporting; Transaction Processing; Database Management; Telemarketing; Desktop Support; Vital Record Storage or Backup Processing; Electronic Banking; Voice Response Unit services; Electronic Funds Transfer; Wealth Management; Electronic Payment; Wireless Services; Electronic Presentment; Employee benefits; and Other.

The questions posed to the user that is conducting the security review of the OSP are organized by topic. FIG. 7 illustrates an exemplary input screen 500, specifically questions related to application development. For each item, the user assesses the adequacy and effectiveness of the control procedures with respect to the OSP and inputs her responses. As illustrated in FIG. 7, many questions 525 have areas to provide the results of the security review in the form of Yes (505), No (510), N/A (515) answers. Additionally, screen 500 provides a Comments section 520. In the Comment section 520 the user can enter or attach a description of the control process(es) or any information, that supports or clarifies the user's responses. The user is advised to indicate what evidence exists to support the responses or cross-reference to the supporting documentation.

Tables 1 through 24 illustrate preferred categories of questions and the preferred questions that are posed to the user in order to document the results of the security review of the OSP.

TABLE 1

COMPUTER OPERATIONS - Policies and procedures should provide reasonable assurance that system capacity, availability, and operation are appropriately provided and monitored.

1. Is a process in place for monitoring system performance, including the performance monitoring tools utilized?
   If yes, provide the documented process and tool(s) utilized.
2. Is a process in place for monitoring network performance, including the performance monitoring tools utilized?
   If yes, provide the documented process and tool(s) utilized.
3. Is redundant hardware and connectivity available for all critical system functions?

TABLE 2

CONTINUITY PLANNING AND TESTING - Policies and procedures should provide reasonable assurance that business recovery plans have been developed and tested.

1. Is there a disaster recovery plan to ensure the availability of alternative processing services should a disastrous event interrupt normal processing at the primary processing site?
   If Yes, please provide a copy of the contingency plan.
2. Is a back-up server/computer site facility available to provide adequate alternate processing services in the event of a disaster?
   If Yes, indicate name of service provider or if service provided internally and how many miles way the backup site is from the primary site.
3. Are periodic disaster recovery tests performed to validate the recovery capabilities of the critical application systems?
   Provide a summary of the results for the last continuity test.
   Provide a list of the scheduled continuity tests for next year.

TABLE 2-continued

CONTINUITY PLANNING AND TESTING - Policies and procedures should provide reasonable assurance that business recovery plans have been developed and tested.

4. Does the back-up processing facility have electrical power supplied via a UPS system and does it have emergency power generators to protect against local power outages?
5. Are communications links to and from the back-up recovery facility maintained and tested as part of the back-up service's on-going disaster preparedness program?
6. Is there a recovery site for the site(s) servicing JPMorgan Chase that uses a different power grid and telecommunications grid from the ones used by the primary site as required by the JPMorgan Chase Business Continuity policy and the JPMorgan Chase Business Continuity Big Rules?
7. Is there also an onshore recovery site for the site(s) servicing JPMorgan Chase as required by the JPMorgan Chase Business Continuity policy and the JPMorgan Chase Business Continuity Big Rules?
8. Will the OSP immediately notify JPMorganChase in the event of a disaster?
   If yes, please identify this notification process.

TABLE 3

CONTRACT MANAGEMENT - Policies and procedures should provide reasonable assurance that service provider and subcontractor contracts contain appropriate provisions and all parties are in compliance with contract provisions.

1. Has an executed non-disclosure agreement with JPMC been documented?
2. Has a contract been signed with JPMC? If yes, provide a copy of the contract.
3. Is a service level agreement in place with JPMC? If yes, provide a copy of the SLA.
4. Has a process been established to review invoices (i.e., assure proper charges for services rendered, rate changes and new service charges)?
5. Has a process been established to review service provider/subcontractor performance relative to service level agreements, determine if contractual terms and conditions are being met and the need for revisions is evaluated?
6. Are appropriate documents and records maintained regarding contract compliance, revision and dispute resolution?
7. Does the service agreement include a clear specification of all relevant terms, conditions, responsibilities, and liabilities of both parties? Examples include: compliance, audit reporting, on-site review, notification of change/risk, SLAs, data ownership, insurance, liability, privacy, dispute resolution, problem reporting and escalation procedures, on-going monitoring, and requirements for service providers outside of the United States?
8. Have all the risk management criteria that apply to this OSP also been applied to any and all sub-contractors (of the OSP) that may have access to JPMorgan Chase data or systems?

TABLE 4

CRYPTOGRAPHY - Policies and procedures should provide reasonable assurance that the confidentiality and integrity of critical and sensitive data is maintained.

1. Has a risk analysis been performed whether the data being transmitted has been determined to be critical and sensitive?
   If Yes, describe the nature of the data and level of criticality/sensitivity.
2. Is the data integrity of transaction/data protected?
   If Yes, describe the cryptographic mechanism used for data integrity (e.g., digital signature, what encryption algorithms are used, what is the key management process used).
3. Is the confidentiality of transaction/data protected using encryption?
   If Yes, describe the encryption algorithms and key management process used.
4. Is non-repudiation of transaction/data ensured using a digital signature?

TABLE 4-continued

CRYPTOGRAPHY - Policies and procedures should provide reasonable assurance that the confidentiality and integrity of critical and sensitive data is maintained.

If Yes, describe the encryption algorithms and key management process used.
5. If JPM personal data is transmitted either to or from the third party service provider, is it encrypted in transit?
6. Is JPM personal data encrypted in storage or are appropriate access authorization models in place to ensure that the Rule of Least Privilege is being adhered to?
If Yes and data is not encrypted, describe the authorization model implemented (i.e., who has access to data).

TABLE 5

DATA PRIVACY - Policies and procedures should provide reasonable assurance that personal information transferred to an OSP is protected from unauthorized use and disclosure.

1. Does the contract require that the OSP process personal data only on our instruction?
2. Does the contract require that the OSP comply with local Data Privacy regulations?
3. Does the contract oblige the OSP to implement appropriate information security measures (i.e. treat all personal data as sensitive data)?
4. Does the contract give JPMorgan Chase the right to audit the OSP processing?
5. Does the contract provide indemnity for JPMorgan Chase in the event of a breach of contract of any of the above?
6. Is there a documented Data Privacy Policy in place and has it been reviewed by the JPMorgan Chase Data Privacy Officer?

TABLE 6

ENVIRONMENTAL CONTROLS - Policies and procedures should provide reasonable assurance that environmental controls exist to protect these facilities.

1. Does the server/computer room have temperature and humidity control systems that are separate from the rest of the facility?
2. Are the server/computer room temperature and humidity systems actively monitored and alarmed during off-hours?
3. Do fire suppression systems and water detection systems protect the server/computer room?
4. Are fire extinguishers placed in the server/computer room?
5. Is the server/computer room electrical power supplied via a UPS (Uninterruptible Power Supply) system and are there emergency power generators?
If yes, describe how long the UPS lasts, how long it takes for the generators to start-up and take over, how long the generators will run without refueling, and what steps have been taken to ensure timely refueling.
Describe how often the UPS and generators tested. Indicate then the date of the last test.

TABLE 7

EXIT STRATEGY

1. Has an exit strategy been documented?

TABLE 8

FINANCIAL - OSP's selected by JPMC should maintain a sound financial condition.

1. Has the JPMorgan Chase Information Owner evaluated a copy of the OSP's latest (i.e., not more than one year old) independent third party 'audited financial' and non-financial audit report?

TABLE 8-continued

FINANCIAL - OSP's selected by JPMC should maintain a sound financial condition.

If applicable, provide a copy of the Annual report (if a publicly traded company) and Financial statements for the prior two years (audited if available).
2. Has a credit rating agency established a rating for the service provider (and significant subcontractors) or has some other form of financial analysis been performed?
If Yes, what is the current credit rating for the service provider (and significant subcontractors)?
3. Are OSP financial obligations to subcontractors being met in a timely manner?

TABLE 9

HARDWARE CHANGE MANAGEMENT - Do policies and procedures provide reasonable assurance that changes to the hardware configuration are authorized, tested, implemented and documented.

1. Does Information Technology (I/T) management authorize all hardware acquisitions?
2. Does the server site, network, database and application management teams coordinate the installation and testing of all hardware changes?

TABLE 10

HUMAN RESOURCES & TRAINING - Policies and procedures should provide reasonable assurance that OSP personnel are adequately screened and trained.

1. Is the identity and background of all vendor staff servicing JPMorgan Chase known based on security background checks including drug testing and fingerprinting where permitted by law?
If yes, describe the screening activities performed on job applicants (e.g., credit, drug screening, references, and criminal background checks).
2. Is there a process in place to screen the (OSP's) outside contractors such as security guards, janitorial services, etc.?
If Yes, describe the process used to screen these individuals and the training process for new hires (e.g., length and breadth of training)
3. Is there an effective process by which the feedback from testing, employees' performance metrics, & quality assurance efforts are incorporated back into the training and development curriculum?
4. Is there a training program/process in place for the hiring of new employees?
If yes, describe the components included in this process.
5. Is the annual rate of personnel turnover for both exempt and non-exempt workers at a level consistent with the industry?

TABLE 11

INSURANCE - Policies and procedures should provide reasonable assurance that OSP is adequately insured.

1. Does the vendor have in place 'appropriate' insurance declaration pages? (e.g., is there sufficient insurance, underwritten by a financially sound insurer, to protect JPMorgan Chase in the event of theft (including theft of intellectual property), malicious destruction or natural disaster.)
If yes, provide a copy of all appropriate insurance declaration pages.
2. Does the policy provide coverage for bonding?
If Yes, how much? How much is the deductible?
3. Does the policy provide coverage for errors and omissions?
If Yes, how much? How much is the deductible?
4. Does the policy provide coverage for fidelity?
If Yes, how much? How much is the deductible?
5. Does the policy provide coverage for workers compensation?
If Yes, how much? How much is the deductible?

TABLE 12

LOGICAL ACCESS SECURITY - Policies and procedures should provide reasonable assurance that security administration is appropriately authorized, performed, documented and reviewed.

1. Does the vendor comply with the JPMorgan Chase requirement that two-factor authentication be used for access to JPMorgan Chase systems?
2. Is all vendor access to a JPMorgan Chase system contained so that the vendor User may only access those system resources to which he or she is authorized?
3. Are the vendor's data protection procedures sufficient to protect JPMorgan data from unauthorized access?
4. Does management authorizes access to OSP system resources (e.g., request process, logging and retention of requests, who authorizes requests, how is appropriateness of access determined)?
5. Are data access files, including access rules, regularly backed-up?
6. Are special privileges allowing security account set-up and administration limited to a segregated Security Administration function?
7. Have individuals who have access to powerful system utilities been documented? Describe how the use of these utilities are monitored.
8. Are all installation and vendor-default passwords provided with new hardware and/or system software immediately reset upon installation?
9. Is there a process to re-certify user access (e.g., how often performed, who authorizes, infrastructure versus application)? If yes, provide certification process.
10. Is there a monitoring process associated with unusual, excessive, suspicious, or unauthorized access attempts by a user, and unsuccessful log-on attempts? Is this type of activity reported to the Information Owner (OSP versus JPMC personnel)?
11. Does the access control process maintain an audit trail of User access activity?
12. Does the audit trail record, at minimum, log User sign-on and sign-off activity? If yes, describe the process used to retrieve the audit trail for investigative purposes (e.g., who performs process, how long is audit trail retained, are passwords included in audit trail)
13. Does the access control process maintain an Access Violations Log? If yes, describe the process associated with the access violation log (e.g., what type of activity is included, how long is the log retained, are passwords included, how frequently is the log reviewed, do procedures exist, how are events investigated/resolved).
14. Is Security Administration notified when OSP or JPMorganChase employees leave or change their area of responsibility?
15. Is a process in place to immediately suspend the access authorizations of Users who are terminated or transferred?
16. Are there password syntax rules in effect (e.g., password length, password complexity, password re-use)?
17. Is there a global access control options in effect (e.g., number of unsuccessful access attempts resulting in the user ID being suspended, password change interval, and workstation time-out due to inactivity, number of concurrent logins permitted)?
18. Are the passwords for super-user accounts (I.e., root - UNIX, Administrator - NT, etc.) unique to each server?
19. Is there a process in place for the setting up and utilization of administrator accounts and super-user accounts (e.g., day to day accounts versus super-user accounts, privileges assigned to accounts, uniqueness of accounts, accountability)?
20. Does a separation of duties exist between individuals who authorize access, personnel who enable access, and personnel who verify access?
21. Does a separation of duties exist between business managers who approve access and persons with Information Custodian responsibilities (other than for System Software)?
22. Does a separation of duties exist between business managers who approve access and personnel with Technology/Business Security Administration responsibilities?
23. Does a separation of duties exist between Information Owners and personnel with Technology/Business Security Administration responsibilities?
24. Does a separation of duties exist between personnel who enable access and those who review audit trails and/or violation logs?
25. Does a separation of duties exist between personnel who install and maintain the logical access control process and those who review audit trails and/or violation logs?

TABLE 13

NETWORK MONITORING AND LOG REVIEW - Policies and procedures should provide reasonable assurance that network security event and violation logs are reviewed for all unauthorized activities in a timely manner.

1. Is a process implemented to ensure all violations and/or unauthorized activities are logged, monitored/reviewed and addressed in a timely manner by the proper level of management?
2. Are all the following security events and violations logged?
Logon and logoff failures
File and object access failures
Use of user rights failures
Restart and Shutdown - both successes and failures
User and group management failures
3. Are full administrative privileges only allowed from the console?
4. Is protection of the vendor's network consistent with the JPMorgan Chase Network Security policy?
5. Are the vendor's security incident response procedures consistent with the JPMorgan Chase Security Incident Management policy?

TABLE 14

NETWORK TOPOLOGY - Policies and procedures should provide reasonable assurance that the network topology is robust and secure.

1. Is a network diagram available for review that details all system connectivity? If yes, please provide a copy of the network diagram, including placement of firewalls.
2. Is the production network firewalled or physically isolated from development or User Acceptance Test networks?
3. Does the design of the network provide for alternate routing in the case of failure of the primary routing?
4. Does the network utilize diverse routing, diverse media, redundant switching facilities and multiple carriers to eliminate any single points of failure and ensure high availability?

TABLE 15

NON DOMICILE OSP - this section gives additional evaluation criteria to be used when an OSP located overseas (outside of the US) is evaluated.

1. Has the JPMorgan Chase Legal Department, or local JPMorgan Chase counsel, determined that the local legal system is adequate, particularly in the areas of contracts, intellectual property and data privacy, to protect JPMorgan Chase? If yes, please indicate the name of the person from Legal who made this determination and provide supporting documentation.
2. Has the JPMorgan Chase country manager or Strategic Technology Sourcing determined that the country is free from political instability that would have an adverse impact on JPMorgan Chase? If yes, please indicate the name of the country manager or the person from STS who made this determination and provide supporting documentation.
3. Has the JPMorgan Chase Real Estate & Facilities Department determined that the local electrical infrastructure is adequate to protect JPMorgan Chase? If yes, please indicate the name of the country manager or the person from STS and provide supporting documentation.
4. Is the local telecommunications infrastructure adequate to protect JPMorgan Chase?

TABLE 16

OPERATIONS - Policies and procedures should provide reasonable assurance that service provider operations are controlled effectively and reviewed by appropriate entities (internal, external, and regulatory).

1. Has a listing of internal audits performed that are related to our OSP relationship been provided (e.g. operational, technical, financial, etc.)?

TABLE 16-continued

OPERATIONS - Policies and procedures should provide reasonable assurance that service provider operations are controlled effectively and reviewed by appropriate entities (internal, external, and regulatory).

2. Has a listing of external audits performed that are related to our OSP relationship been provided (e.g. SAS 70 Level II, Penetration Tests, etc.)?
3. Has a listing of Regulatory agency reviews performed that are related to our OSP relationship been provided (e.g. OCC, OTC, FTC, State, etc.)?
4. Has a copy of the External financial auditor reports been provided?
5. Has a copy of the Internal Audit Department annual review plan as it relates to our OSP relationship been provided?
6. Has a copy of due diligence reports on any sub-contractors that are related to our OSP relationship been provided?
7. Where significant deficiencies have been identified, has appropriate action plans been developed and follow-up performed?
8. Are access control reports and related monitoring reports provided to an information owner (OSP or JPMC) to identify suspicious activity.
9. Have key service provider positions been identified and appropriate succession planning performed?
10. Are periodic meetings scheduled between the service provider and the appropriate relationship manager (OSP or JPMC) to discuss performance and operational issues?
11. Is there any training that should be provided by the service provider to JPMC personnel? Are there any user groups or forums in which JPMC personnel should participate? (If no, indicate N/A.)
12. Where appropriate, is customer advocacy performance and compliance monitored by appropriate JPMC personnel?

TABLE 17

PHYSICAL SECURITY - Policies and procedures should provide reasonable assurance that physical access to the processing environment is restricted to authorized personnel.

1. Does the company own the facility? (If leased-please document when the lease expires.)
2. Has the number of tenant occupied floors been accounted for? Describe the building tenants with common walls, floors or ceilings that are contiguous to areas occupied by the vendor.
3. Is the facility equipped with surveillance camera(s)?
4. Are the cameras monitored?
   If yes, provide monitoring process including hours of operation, who monitors, tape retention, etc.
5. Is there an actively monitored alarm system that physically secures the server/computer processing facility/location?
6. Is access to the facility controlled by the use of a token-based card access control system?
7. Is access to the server/computer room controlled? If yes, describe physical control process (e.g., written authorizations, type of access control system, biometrics, mantrap, re-certification of access, maintenance of access, visitor access, service technician access, business versus non-business hours).
8. Is server/computer room access and denial of access electronically logged and periodically reviewed by the security administrator?
9. Is all production server/computer equipment located in the server/computer room?
10. Do access request changes for the card access system require written approval of the site Operations Manager?
11. Are keys to cabinets, equipment rooms, and wiring closets held under proper custody? Is there a master key log?
12. Are telecommunication line junction points (wiring and router closets, etc.) secured to prevent tampering?
13. Do the OSP's policies and procedures on physical security provide reasonable assurance that physical access to the processing environment is restricted to authorized personnel?

TABLE 18

PROBLEM MANAGEMENT - Policies and procedures should provide reasonable assurance that production problems are identified, assigned, resolved and reported in a timely manner and raised to an appropriate level in accordance with a documented process.

1. Is a process in place to address production problems (e.g., personnel involved, documentation, retention, and timeliness)?
2. Is a problem-tracking log produced that details all processing problems that occurred during the previous 24 hours? Is a unique number assigned to each problem?
3. Are changes resulting from a production problem subject to the same process as program change management?
4. Is there a documented process to track that follow-up actions are completed that will prevent a re-occurrence of production problems?

TABLE 19

PRODUCTION SUPPORT - this section gives additional evaluation criteria to be used when an OSP is considered for production support.

1. Is the granting of emergency access to JPMorgan Chase systems consistent with JPMorgan Chase procedures?
2. Is the emergency change process consistent with the JPMorgan Chase Change Management policy?
3. Is a copy of all production source code, data, and documentation needed to install the current production system at a JPMorgan Chase facility stored at a JPMorgan Chase facility?
4. Is all elevation of system objects to production done by JPMorgan Chase personnel?
5. Is the monitoring of privileged access consistent with the JPMorgan Chase Logical Access policy?
6. Are the vendor's data protection procedures sufficient to protect JPMorgan data from unauthorized access?

TABLE 20

REMOTE ACCESS - Policies and procedures should provide reasonable assurance that external access to the internal network is appropriately restricted, monitored and reviewed.

1. Is remote access to the internal network limited to authorized users and are their activities logged?
2. Do all users with remote access privileges require such access for their job function and has management (i.e., Information Owner) properly authorized the remote access capabilities?
3. Have any third party service providers been granted remote access privileges and is there a business requirement for such remote access?
4. Is all remote access configured to prevent war dialing?
   If yes, describe how this access has been configured to prevent war dialing.
5. Is there a process in place for controlling/securing devices that permit dial-in access?
6. Are clients that dial-in authenticated by the use of one-time password generation token-based technology?

TABLE 21

SYSTEMS DEVELOPMENT AND PROGRAM CHANGE MANAGEMENT - Policies and procedures should provide reasonable assurance that new systems or changes to existing systems are properly authorized, tested, approved, implemented and documented.

1. Is there a systems development methodology/model implemented within the OSP (e.g., waterfall, prototyping, Capability Maturity Model level, etc.)?
2. Is a systems development change control process implemented (e.g., request process, documentation and retention, who approves, review/QA, testing, segregated test environments)?
3. Is each project analyzed and is a development strategy employed?
4. Does this strategy include project costing, resource requirements, and required date of implementation?

TABLE 21-continued

SYSTEMS DEVELOPMENT AND PROGRAM CHANGE MANAGEMENT - Policies and procedures should provide reasonable assurance that new systems or changes to existing systems are properly authorized, tested, approved, implemented and documented.

5. Is the movement of properly tested application programs into production program libraries performed by a production change control function that is independent of the development process?
6. Does the server/computer site use a source version control product to control the change management process?
   If Yes, what is the name of the source version control product being used
7. Is access to this source version product controlled by data access control software?
8. Is a systems software program change control process implemented (e.g., request process, documentation and retention, who approves, review/QA, testing, segregated test environments, functional versus system versus installation testing)?
9. Do the appropriate levels of management approve emergency changes, prior to implementation?
10. Are procedures in place that require that emergency changes be supported by appropriate documentation (e.g., evidence of management approval, code review)?
11. If JPMC personal data is hosted at the third party service provider, is it masked/anonymized in the development, test and/or production environments?
12. If JPMC personal data is not masked, is a procedure in place to ensure that it is deleted from the development and test environments when no longer in place?
13. Is a process implemented regarding controls over data altering utilities, user exits, privileged instructions, and libraries?

TABLE 22

VIRUS PROTECTION - Policies and procedures should provide reasonable assurance that appropriate virus counter measures have been implemented.

1. Is a virus protection product loaded on all workstations and servers?
   If yes, describe what products are used with each platform within your environment.
2. Is there a process in place to implement periodic updates to the virus scanning software implemented which includes the implementation of updates?

TABLE 23

VITAL RECORD MANAGEMENT: - Policies and procedures should provide reasonable assurance that appropriate data file and production software backups are maintained off-site.

1. Is off-site disk mirroring being performed?
   If yes, indicate if this is for every application file, all production servers and system software.
   If Yes to question 1: please answer "n/a' to questions 1, 2, 3 and 4.
   If No to question 1: proceed with question 2 below.
2. Are backups produced daily for every application file and sent to the off-site tape vault?
3. Are full image backups of all production servers produced daily and sent to the off-site tape vault?
4. Is system software backed up periodically and sent to the off-site tape vaults?
   If Yes, how frequently is this process performed.
5. Is a tape management software package used to track backup tapes that are sent off-site?
   If Yes, what tape management software package is used.

TABLE 24

WEB SITE - Policies and procedures should provide reasonable assurance that the Web site is protected from unauthorized access and modification.

1. Are all unnecessary daemons disabled and removed from the system?
2. Are periodic reviews of router and firewall logs performed to validate filter operation?
3. Are all services which are not required (e.g., Telnet) turned off?
4. Is a security software product (e.g. Internet Security Systems' Safesuite) periodically executed to determine potential security vulnerabilities on such interfacing domain components as routers, web servers, mail servers, FTP servers,
   Name servers, firewalls and network
   monitors (i.e., tested from inside and outside the firewall)?
   If Yes, what product(s) is used?
5. If the third party software is branded with the JPMC brand, does the web site include the JPM data privacy statement? If it is branded with the third party provider's brand, do they have a commensurate statement in place?
6. Is there a mechanism in place to capture and record consent of Data Privacy preferences, if necessary by law?
7. Does the privacy statement contain details of cookies or click stream methods used?

As illustrated in Tables. 1-24, the system and process of the present invention provides a systematic, standardized and comprehensive review of the operations of the OSP. For areas that require attention or do not meet policy compliance, a corrective action, risk acknowledgment or risk acceptance process will automatically be invoked. Such processes should identify the condition, remediation plan, identification of accountable personnel and targeted deadlines for implementation.

Returning to FIG. 2, step five (70) of the process requires the user to document the results of her review of the continuity plans and capabilities of the OSP. Continuity relates to the plans and procedures for providing the continuity of business operations in cases of business interruption. Such business interruption can occur due to a variety of reasons including physical facility emergency. The continuity in business operations can be in regard to at least to real estate, and critical business resources such as computers, databases and applications.

FIG. 8 illustrates the user interface screen 550 applicable to the review of the continuity preparedness review of the OSP. Question 575 asks whether or not the OSPs business continuity plan has been tested in the past twelve months. If it has, the user inputs the date the plan was tested. Question 580 prompts the user to indicate when the next test of the continuity plan is scheduled. The questions listed in area 585 require the user to document specific aspects of the OSP's continuity plan. As with the other above described user interface screens, continuity screen 550 provides the user with the ability to answer Yes (555), No (560), N/A (565) to the posed questions. Additionally, screen 550 provides a Comments section 570. In the Comment section 570 the user can enter or attach a description of the control process(es) or any information, that supports or clarifies the user's responses. The user is advised to indicate what evidence exists to support the responses or cross-reference to the supporting documentation.

The most significant of the questions listed in area 585 relate to the existence and adequacy of backup or recovery locations. The purpose of identifying the recovery locations of OSPs is to provide system 10 with the capability, in an emergency situation, to assess whether or not (or when) a particular department can resume operations with its OSP. For example, if the OSP's primary location is in the same geographical location as the department's primary location, in the case of a flood in the zone, it would be reasonable to assume that the OSP will also not be operational.

Furthermore, identification of the OSP's recovery location will enable the organization to assess whether or not OSP is adequately prepared in the case of a disaster. For example, if the OSP has no recovery location, the firm might decide to use another OSP with adequate recovery procedures, or might pressure the existing external OSP to develop such a recovery site.

The structured review provided by system 10 through interface 550 allows business managers and technologists to stage continuity scenarios with OSP relationships and make informed decisions around key processes, people, locations and critical business applications including production, development and QA environments regarding internal and external resources.

The data input through interface 550 introduces enhanced reporting capabilities to track and monitor key issues of the OSP and their ongoing progress to close substantial gaps. Provides real-time, objective data for various scorecards requested enterprise-wide. As further described below, the data with respect to the OSP's continuity preparedness allows system 10 to produce an enterprise-wide "heat map" in the test, plan and execute space including corrective actions plans, risk acknowledgments and board issues of every OSP. System 10 further provides a repository to identify critical incidents and pending resolutions during an event involving an OSP. System 10 further provides the capabilities to link the enterprise's continuity plans to the OSP insuring there is alignment. Finally, system 10 provides a core repository in database 40 (FIG. 1) to manage, monitor and measure key continuity processes regardless of service provider (e.g., internal, external, onshore, offshore).

Step 5 of the process (FIG. 2) is to assist the manager in developing a contact strategy with respect to the OSP for use, for example, during cases of emergency. The contact strategy provides system 10 with complete information regarding each employee that is connected with the OSP relationship, as well as documenting the contacts at the OSP itself. To this end, separate records are created in system 10 for the identified employees and OSP personnel. FIG. 9 illustrates the user interface 600 for accessing the contact records in system 10. The user is able to input new employee or OSP employee contact information through interface 605. The contact records preferably contain: the employee's name; primary work location, primary work region; primary work branch; primary work phone number; primary work facsimile number; pager number; PIN number for the pager cellular phone number; home phone number; alternate home (e.g., vacation); personal Internet addresses; alternate work location; alternate work address; and alternate work phone number.

The input of all of the employees' personal information allows system 10 to maintains a comprehensive and up to date contact list including key corporate senior executives in addition to all senior LOB business executives. In addition to the above personal information such as phone numbers for office, home, alternate home (e.g., vacation), cellular, personal Internet addresses, pagers, the contact list for key executives includes an identification of the person's alternate/designee.

The final step in the process, step 6 (75 in FIG. 2) is to assess the compliance of the OSP with the privacy policies of the enterprise. Privacy issues with respect to the collection, use and dissemination of personal information are becoming increasingly important for every enterprise to monitor and track. As the laws of each state with respect to the privacy of employees and customers is evolving rapidly, it is very important that the privacy policies of the enterprise are reviewed and updated regularly. As OSPs are increasingly processing data that has a privacy component, it is equally important that the enterprise review the OSP's compliance with the enterprise's privacy policies.

As depicted in FIG. 10, screen area 650 allows the user to select a category of the enterprise's privacy policy for assessing the operations processes and procedures of the OSP. The preferred categories include: Customer Services Processes 655; Data Destruction and Disposal Procedures 660; Data Extraction and Modification 665; Development and QA/UAT Environment Processes 670; Encryption Practices; OSP practices 680; Related Applications and Processes 685; and Website Practices; 690. Depending on the services being provided by the particular OSP under review, the user may select one or more of categories 655-690.

Screen area 695 depicts the questions posed to the user when she selects the Customer Servicing Processes category 655. As seen in this user interface screen 695, the user is asked to review the training and procedures of the customer service representatives. For example, the user is asked whether the OSP employee providing customer services has been trained with respect to the safeguarding of private information. Screen 695 is exemplary of the types of questions requiring answers by the user when selecting any of the privacy categories 655-690.

When a user provides a negative answer to any of the questions in any of the assessments in system 10 as described above, system 10 automatically asks the manager if she would like to develop a Corrective Action Plan (CAP) if the gap will be remediated within ninety days. As implied by its name, a Corrective Action Plan is a plan to correct the condition that has caused the manager to answer a question negatively. If the manager answers yes to developing a CAP, system 10 brings the manager to a CAP input screen in which the manager describes the condition which caused the negative response, the reason for the condition (e.g., funding) the plan to correct the condition, the person responsible for seeing that the correction is done, a target date by which the correction will be completed, and any attachments which are required to more fully explain the CAP. The CAP that is developed is stored in the database and appropriately linked to the records for this department.

If the manager says "No" when asked if she wants to develop a CAP, the manager is automatically brought to a Risk Acceptance screen. In this screen, the manager is required to describe the reasons for the requirement of the Risk Acceptance; what compensating controls are in place, if any; the likelihood of an impact due to the risk involved (high, medium or low); a description of the potential impact; a rating of the potential impact (catastrophic, severe, moderate, negligible); and an implementation plan. The Risk Acceptance by the manager is reviewed and approved by the appropriate LOB management. If the Risk Acceptance is not approved by management, a CAP must be developed in order to correct the risk condition.

One of the significant features of the present invention is the ability of system 10 to rollup all of the collected information into clear and easily comprehensive status report. FIG. 11 illustrates one such report, in the form of a computer screen, known as a State of Health Report Card 700. This report 700 provides enhanced capabilities to track and monitor key issues and their ongoing progress to close substantial gaps. Report 700 provides the highest level of status of the reviews of the OSP described above, including corrective actions plans, risk acknowledgments and board issues as further described below. This status screen 700 provides a core repository to manage, monitor and measure all OSPs utilized by the enterprise.

As seen in FIG. 11, this status screen contains the status of an OSP 705 corrective actions plans 715, risk acknowledgments 740, and board issues 745. A record 720 is capable of being displayed for each line of business within the organization (only three illustrated in FIG. 11). For each record 720, the name of the Senior Business Executive 725 and the name of the Line of Business 730 is displayed. The actual name of the Line of Business 732 is a hyperlink that brings up a status screen comparable to screen 700, except that it shows the status of the elements for the next level down in the corporate hierarchy (e.g., the department level). Using this feature, a user is able to drill down (or roll up) to the level of status desired by the particular user.

The status of a particular element of the OSP review is depicted as a colored icon, e.g., icon 735 Corrective Action Plan 715. Each icon represents a different status. In addition to each icon being a different color, it is also a different shape. This allows user having devices without color capability to quickly determine the status of a particular item. FIG. 12 illustrates a legend containing the different icons and their associated statuses. In the particular statuses depicted in FIG. 11, status 735 indicates that there is no Corrective Action Plan in place for the OSPs being employed by this particular line of business. Were there a Corrective Action Plan in place and documented on system 10, by clicking on the status icon 735 in the Corrective Action Plan column 715, the user can immediately bring up the CAP developed by the manager. If the manager did not develop a CAP, but rather performed a Risk Acknowledgement, this is indicated in column 740. Similarly, by clicking on the icon 742 in this column 740, the user will be able to see the specific Risk Acknowledgement developed by the manager.

If the user clicks on one of the status icons in the Outside Service Provider column 705, system 10 drills down the data to the next level of status as illustrated in FIG. 12. State of Health status screen gives the manage a more detailed look at the status of the reviews of any particular OSP that provides services to the particular line of business. Column 805 contains the name of the particular OSP. As seen in FIG. 12, five different OSPs 865 have been identified as performing work for the selected LOB. Column 810 provides the status of the OSP with respect to Managing Risk. Column 815 provides the status of the OSP with respect to the Continuity review. This status is derived by system 10 from the analysis of the results of the review as discussed above in connection with FIG. 8. Column 820 provides the status of the OSP with respect to the Privacy review. This status is derived by system 10 from the analysis of the results of the review as discussed above in connection with FIG. 10. Column 825 provides the status of the OSP with respect to the Financial review. This status is derived by system 10 from the analysis of the results of the review as discussed above in connection with step 3 (60) in FIG. 2. Column 830 provides the status of the OSP with respect to the Sourcing review. This status is derived by system 10 from the analysis of the results of the review as discussed above in connection with step 3 (60) in FIG. 2. Column 835 provides the status of the OSP with respect to the Legal review. This status is derived by system 10 from the analysis of the results of the review as discussed above in connection with step 3 (60) in FIG. 2. Column 840 provides the status of the OSP with respect to the External Connectivity review. This status is derived by system 10 from the analysis of the results of the review as discussed above in connection with step 3 (60) in FIG. 2.

Column 845 provides the status of the OSP with respect to the Business Impact review. This status is derived by system 10 from the analysis of the results of the review as discussed above in connection with FIG. 4. As previously discussed, the Criticality status determined for the particular OSP is cross-referenced in the OSP description interface as depicted in FIG. 3. Column 850 provides the status of the OSP with respect to the Country Impact review. This status is derived by system 10 from the analysis of the results of the review as discussed above in connection with FIG. 5. Column 855 provides the status of the OSP with respect to any Risk Acknowledgements required by negative assessments of any of the reviews as discussed above. Similarly, column 860 provides the status of the OSP with respect to any Corrective Action Plans required by negative assessments of any of the reviews as discussed above.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A computer-implemented method for an enterprise to assess risks associated with an outside service provider, the method comprising:

identifying, via an user interface, outside service provider information that describes the outside service provider;

storing the outside service provider information in a database;

identifying, via the user interface, resource information that describes resources of the enterprise associated with services provided by the outside service provider;

storing the resource information in the database;

assessing, via computer server, a risk on the enterprise from a degradation of the services from the outside service provider, wherein assessing the risk on the enterprise comprises assessing a business risk on the enterprise and assessing a country risk on the enterprise, wherein assessing the business risk on the enterprise further comprises:

assessing an impact on external customers of the enterprise resulting from the degradation of the services from the outside service provider;

assessing an impact on internal customers of the enterprise resulting from the degradation of the services from the outside service provider, wherein the internal customers of the enterprise include at least a customer implementing one or more internal applications of the enterprise;

assessing a financial impact resulting from the degradation of the services from the outside service provider;

assessing an allowable time period that the degradation of the services from the outside service provider can last; and assessing an impact on regulatory obligations resulting from the degradation of the services from the outside service provider, wherein the impact on regulatory obligation includes a financial penalty;

storing the assessment in the database;

automatically determining, via the server, a criticality of the outside service provider in response to the assessment;

storing the criticality in the database; and providing, via the user interface, status data from the database, wherein the status data comprises at least one of a status of:

the resource information;
the assessment; and
the criticality.

2. The method of claim 1, wherein the step of assessing the country risk on the enterprise further comprises:
identifying countries in which the outside service provider operates; and
determining a country impact risk associated with the identified countries, wherein the step of automatically determining the criticality is also in response to the country impact risk.

3. The method according to claim 2, wherein the step of determining a country impact risk associated with the identified country further comprises:
collecting economic condition information with respect to the identified country;
storing the economic condition information in the database;
collecting social condition information with respect to the identified country;
storing the social condition information in the database;
collecting political condition information with respect to the identified country;
add storing the political condition information in the database.

4. The method according to claim 1, wherein at least one of the resources of the enterprise includes at least one software application employed by the enterprise.

5. The method according to claim 1, further comprising:
assigning specific people to fulfill roles with respect to management of a relationship with the outside service provider, wherein the roles include at least one of information owner and information risk manager.

6. The method according to claim 5, further comprising:
receiving acknowledgements of the acceptances of the assignments from the specific people.

7. The method according to claim 5, further comprising:
assigning alternate people to fulfill the roles.

8. The method according to claim 5, wherein the role of the information owner comprises at least one of:
obtaining from the outside service provider copies of financial and non-financial audit reports;
obtaining documentation describing the outside service providers procedural, physical access, logical access and business recovery controls;
requiring notification by the outside service provider of any organization, security-related and other changes affecting the availability, confidentiality, or integrity of the services provided by the outside service provider; and
initiating a risk assessment process.

9. The method according to claim 5, wherein the role of information risk manager comprises at least one of:
maintaining an updated list of outside service providers used by the enterprise; and
allocating resources for the outside service provider assessment process.

10. The method according to claim 1, wherein all of the steps of the method are facilitated using a software application, the method further comprising:
generating data input screens for accepting input from a user; and
providing drop down boxes on the data input screens in order to facilitate selection of predefined information.

11. The method according to claim 1, further comprising assessing a recovery plan of the outside service provider.

12. The method according to claim 11, wherein the assessment of the outside service provider recovery plan further comprises:
questioning a developer of the recovery plan as to whether it has required elements; and
developing a corrective action plan to address missing required elements.

13. The method according to claim 12, wherein the required elements include:
an alternate site for providing the services; and
a business continuity plan for resumption of the services at the alternate site.

14. The method according to claim 1, wherein the step of providing status data further comprises:
providing status data on the enterprise level; providing status data on a line of business level; and
providing status data on a department level.

15. The method according to claim 1, wherein the enterprise has policies and procedures for protecting an integrity of provision of services, the method further comprising assessing a compliance of the outside service provider to the policies and procedures.

16. The method according to claim 15, further comprising developing a corrective action plan if the outside service provider is not in compliance, the corrective action plan containing steps required to bring the outside service provider into compliance.

17. The method according to claim 16, further comprising obtaining an acknowledgement by management of the enterprise of risk associated with the non-compliance of the outside service provider.

18. A system for an enterprise to assess risks associated with an outside service provider comprising:
a user interface for interfacing with users of the system;
at least one computer database server and at least one computer application server coupled to the user interface; and
at least one database and at least one application respectively coupled to the computer database server and the computer application server;
wherein the system is programmed to:
accept outside service provider information that describes the outside service provider;
store the outside service provider information in a database;
accept resource information that describes resources of the enterprise associated with services provided by the outside service provider;
store the resource information in the database;
assess an impact risk on the enterprise from a degradation of the services from the outside service provider, wherein assess the risk on the enterprise comprises assessing a business risk on the enterprise and assess a country impact risk on the enterprise,
wherein assessing the business risk on the enterprise comprises:
an assessment of an impact on external customers of the enterprise resulting from the degradation of the services from the outside service provider;
an assessment of an impact on internal customers of the enterprise resulting from the degradation of the services from the outside service provider wherein the internal customers of the enterprise include at least a customer implementing one or more internal applications of the enterprise;

an assessment of a financial impact resulting from the degradation of the services from the outside service provider;

an assessment of an allowable time period that the degradation of the services from the outside service provider can last; and an assessment of an impact on regulatory obligations resulting from the degradation of the services from the outside service provider, wherein the impact on regulatory obligation includes a financial penalty;

store the assessment in the database;

automatically determine a criticality of the outside service provider in response to the assessment;

store the criticality in the database; and provide status data from the database, wherein the status data comprises at least one of a status of the resource information, the assessment, and the criticality.

19. The system of claim 18, wherein the assessment of the country impact risk on the enterprise further comprises:

accept countries in which the outside service provider operates; and determine a country impact risk associated with the countries, wherein the step of automatically determining the criticality is also in response to the country impact risk.

20. The system according to claim 18, wherein at least one of the resources of the enterprise includes at least one software application employed by the enterprise.

21. The system according to claim 18, wherein the database further includes:

an assignment of specific people to fulfill roles with respect to management of a relationship with the outside service provider, wherein the roles include at least one of information owner and information risk manager.

22. The system according to claim 21, wherein the database further includes:

acknowledgements of the acceptances of the assignments from the specific people.

23. The system according to claim 21, wherein the database further includes:

an assignment of alternate people to fulfill the roles.

24. The system according to claim 18, wherein the system is further programmed to assess a recovery plan of the outside service provider.

25. The system according to claim 24, wherein the user interface is used to collect responses from the developer of the recovery plan as to whether it has required elements, and to collect a corrective action plan to address missing required elements.

26. The system according to claim 25, wherein the required elements include:

an alternate site for providing the services; and a business continuity plan for resumption of the services at the alternate site.

27. The system according to claim 18, wherein the status data further comprises:

status data on the enterprise level; status data on a line of business level; and status data on a department level.

28. The system according to claim 18, wherein the user interface further comprises:

data input screens for accepting input from a user; and drop down boxes on the data input screens in order to facilitate selection of predefined information.

* * * * *